May 16, 1933.  A. G. F. KUROWSKI  1,909,770
COMBINED TYPEWRITING, BOOKKEEPING, AND CARD PERFORATING MACHINE
Original Filed Sept. 22, 1928  8 Sheets-Sheet 1
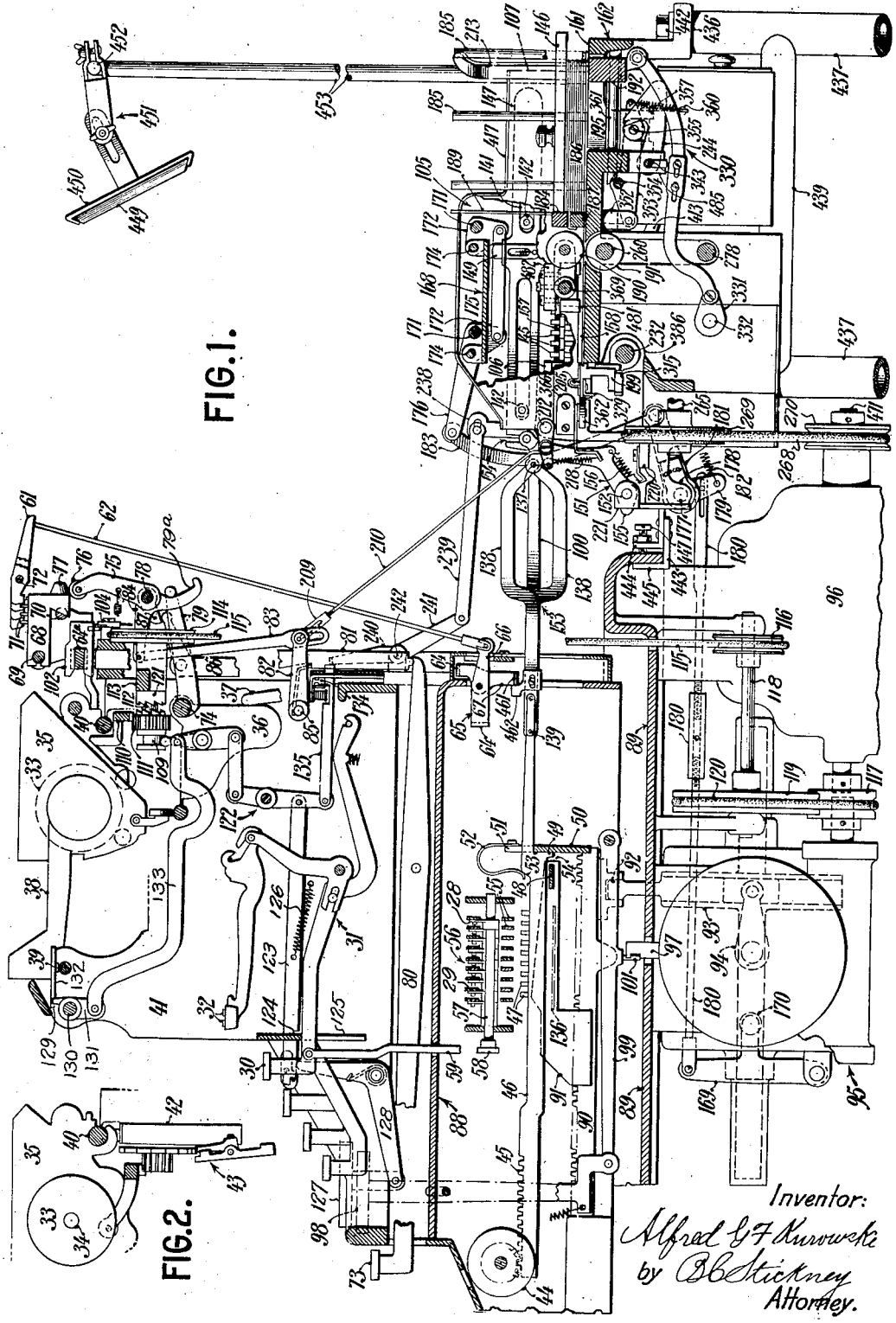
Inventor:
Alfred G. F. Kurowski
by B. C. Stickney
Attorney.

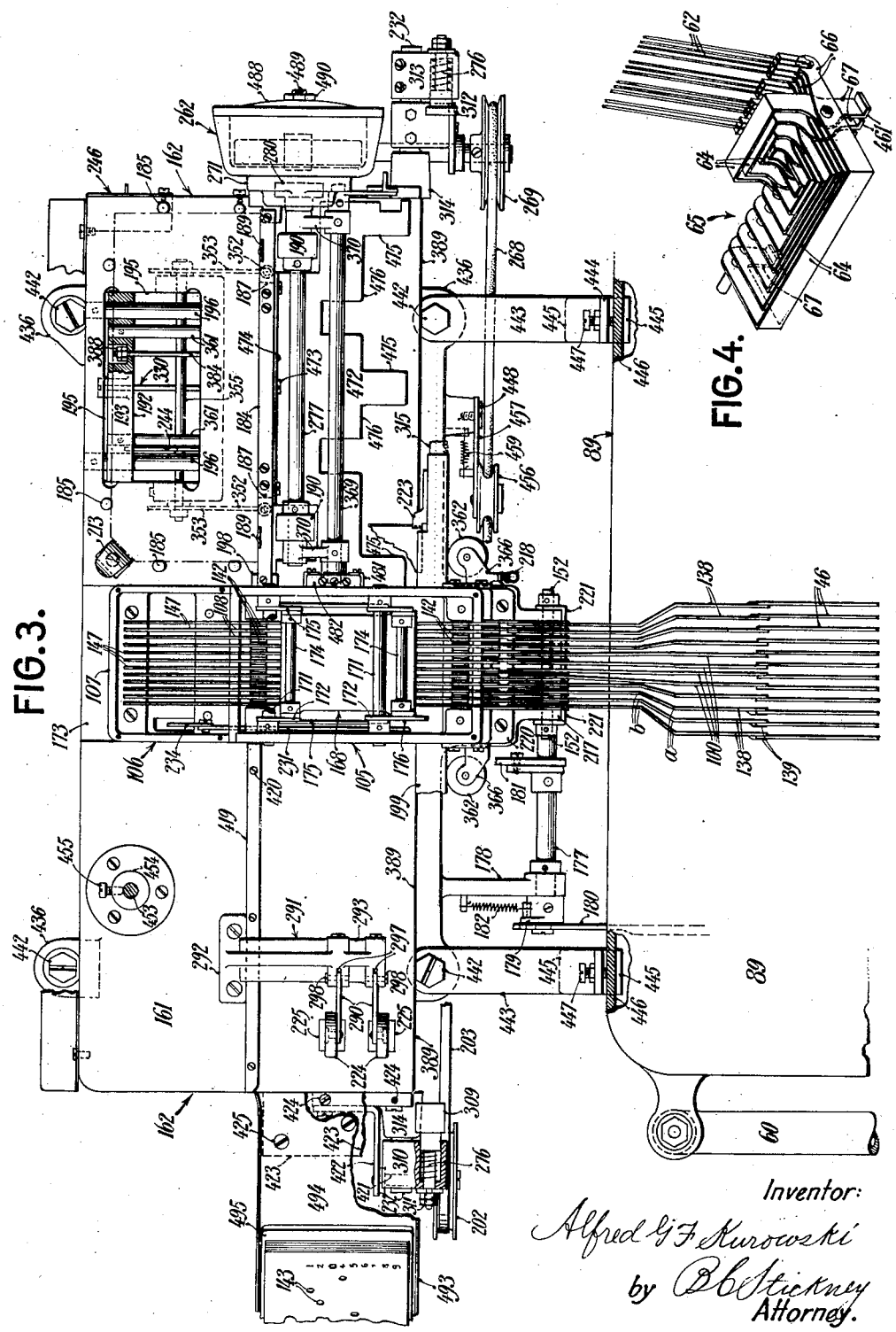

May 16, 1933.  A. G. F. KUROWSKI  1,909,770
COMBINED TYPEWRITING, BOOKKEEPING, AND CARD PERFORATING MACHINE
Original Filed Sept. 22, 1928    8 Sheets-Sheet 3

Inventor:
Alfred G. F. Kurowski
by B. C. Stickney
Attorney.

May 16, 1933.   A. G. F. KUROWSKI   1,909,770
COMBINED TYPEWRITING, BOOKKEEPING, AND CARD PERFORATING MACHINE
Original Filed Sept. 22, 1928   8 Sheets-Sheet 4

Inventor:
Alfred G. F. Kurowski
by D. C. Stickney
Attorney.

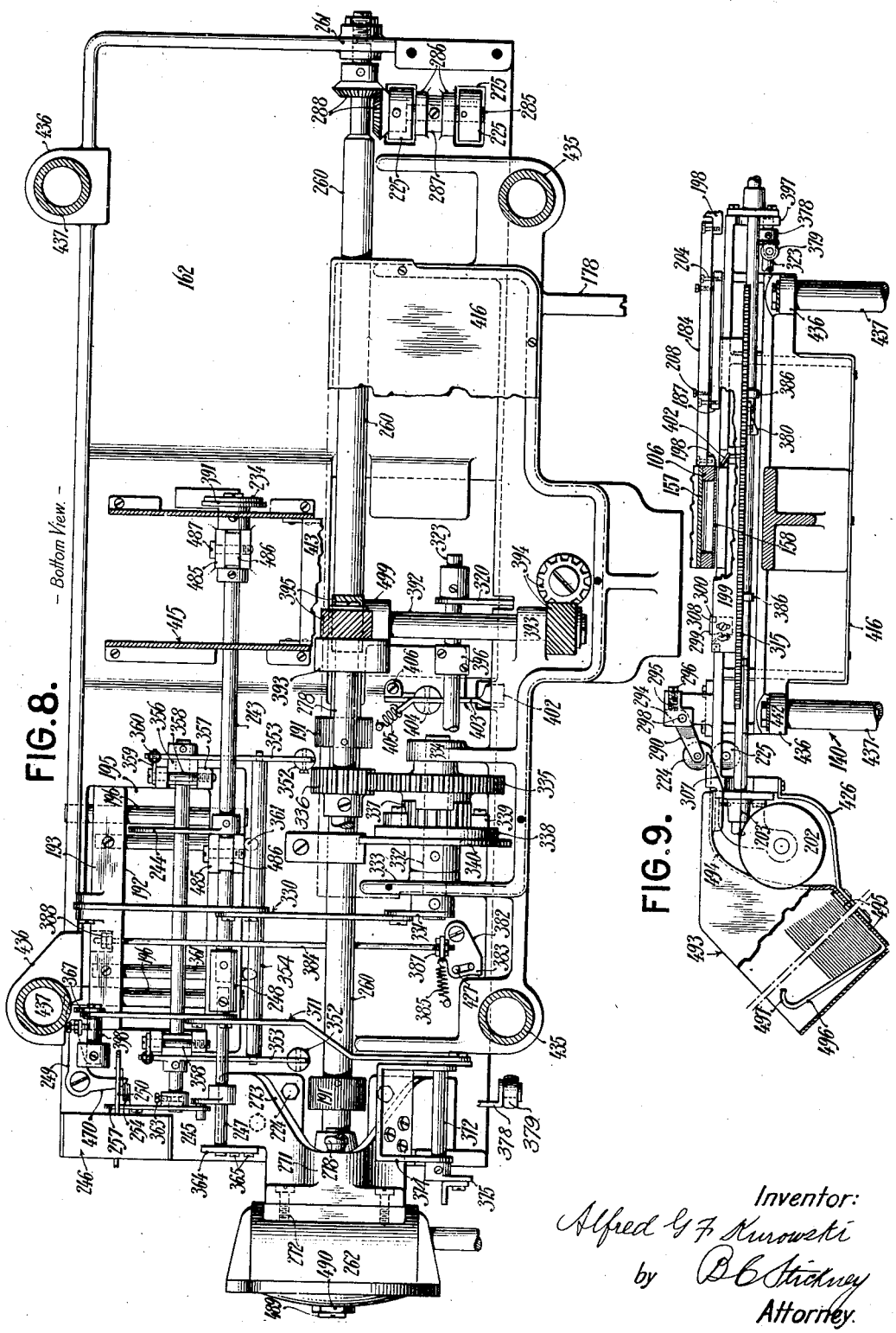

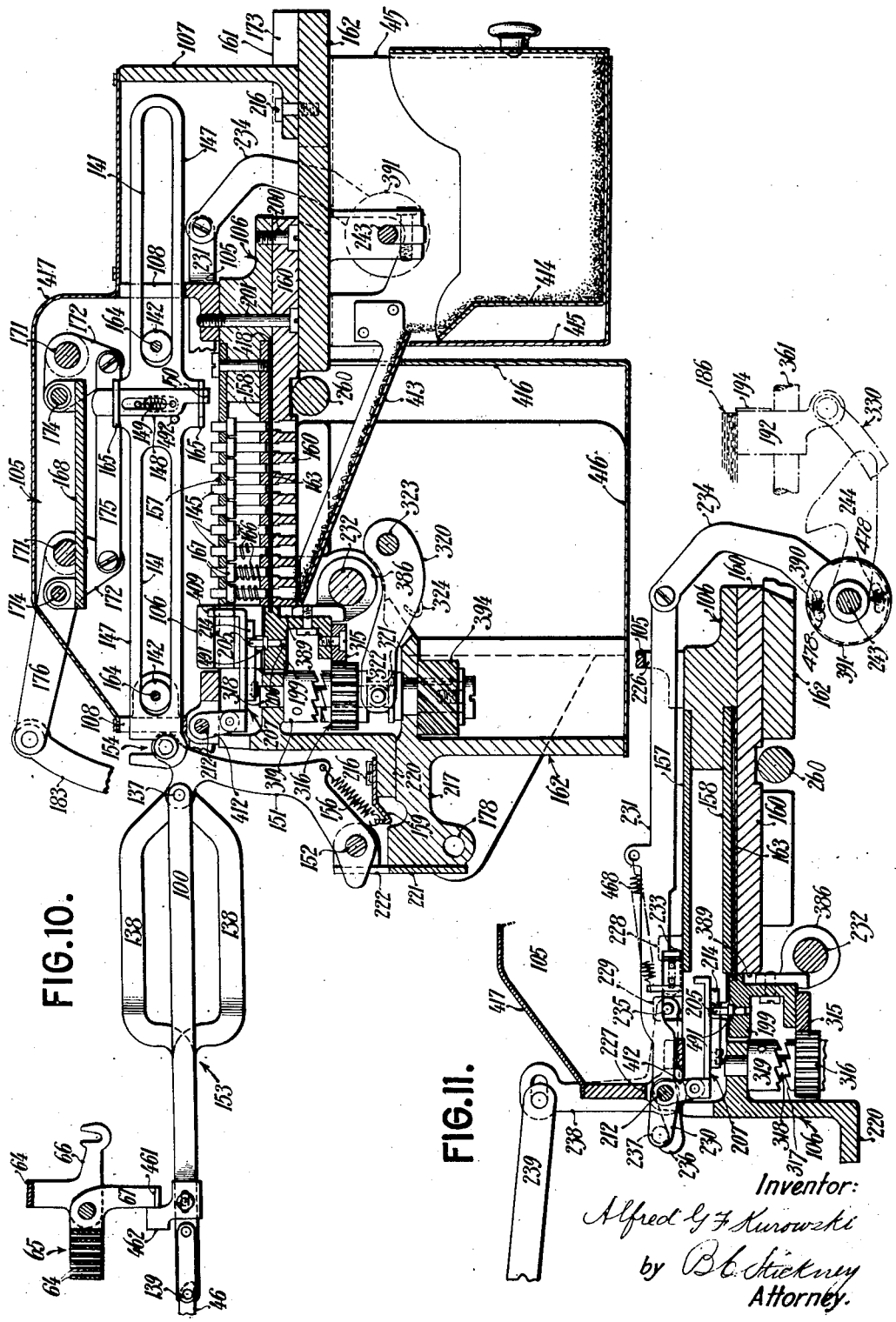

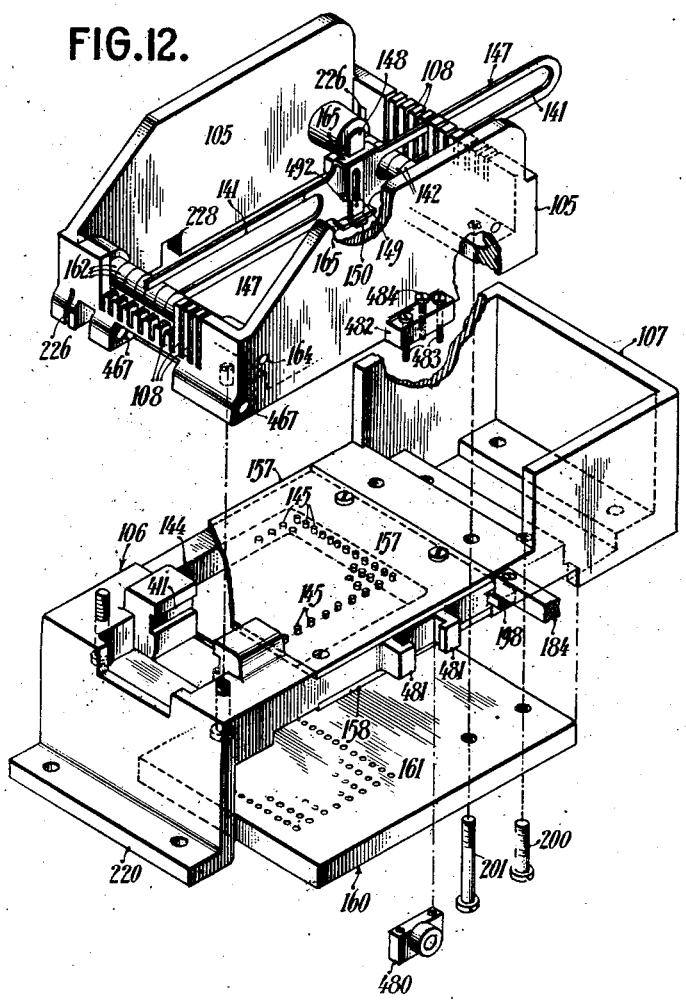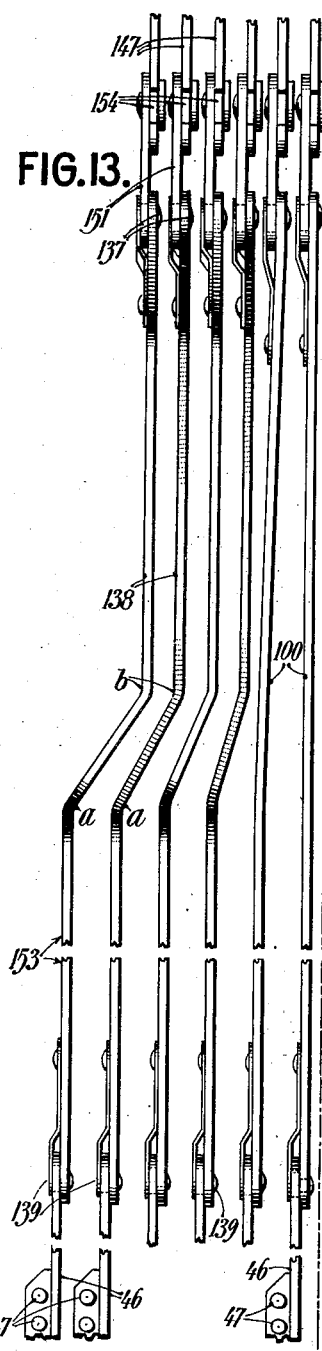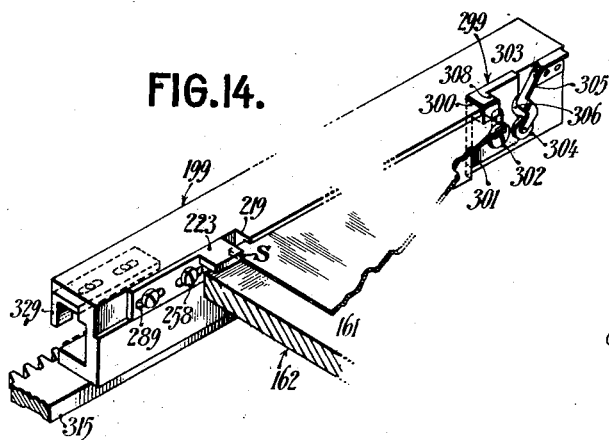

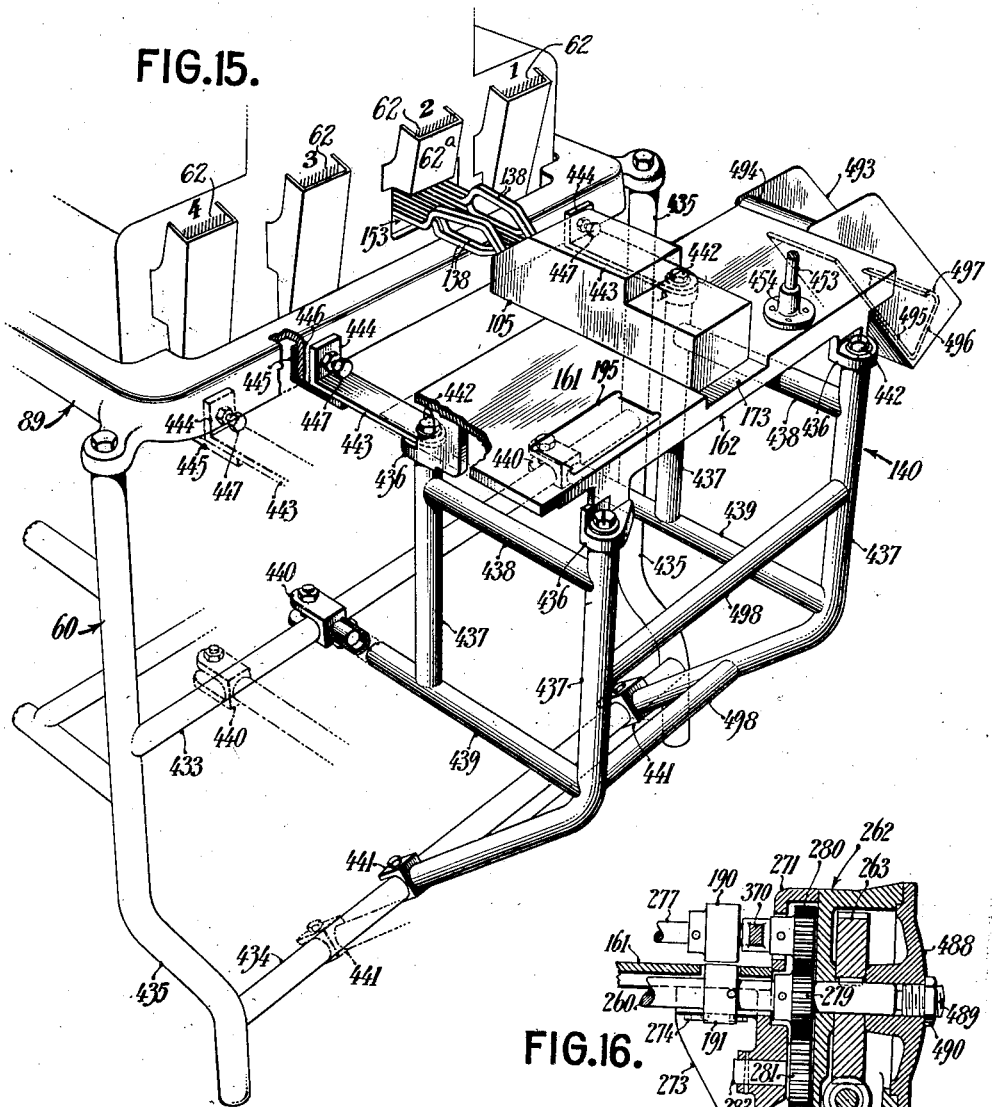
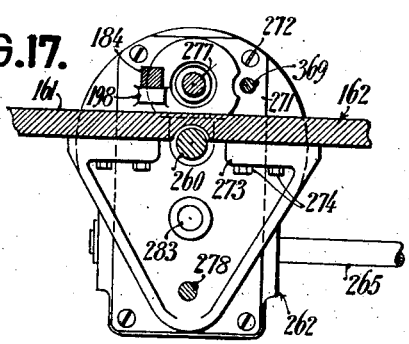

Patented May 16, 1933

1,909,770

UNITED STATES PATENT OFFICE

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE

COMBINED TYPEWRITING, BOOKKEEPING, AND CARD-PERFORATING MACHINE

Application filed September 22, 1928, Serial No. 307,586. Renewed February 12, 1932.

This invention relates to a combined typewriting, computing and card-perforating machine, and particularly relates to improvements in the machine set forth in the application of Frank K. Davis, Serial No. 204,249, filed July 8, 1927 (now Patent No. 1,864,714, dated June 28, 1932), in which machine the well-known Underwood-Hanson typewriting and computing mechanism is combined with card-perforating mechanism. Said mechanisms are combined to type and compute and concomitantly produce punched record-cards of the typed and computed items. To this end, denominational computing register-bars, whose extents of movements are controlled by the operation and values of numerical type-keys, may, through their movements, operate means to select corresponding digit-punches in corresponding denominational punch-columns of the perforating mechanism, preparatory to a subsequent punching operation.

The Underwood-Hanson computing mechanism may have several registers or denominational dial-wheel sets, each having a corresponding set of denominational register-bars, each bar carrying a set of nine digit-pins individually settable for determining the digit-accumulating movement of said bar. Each set of retracted register-bars thus presents a nest of digit-pins extending in digit-defining rows crosswise of the register-bars.

For each digit-row there is a pin-setting bar extended above, parallel to, and slightly ahead of said row, each pin-setting bar being movable edgewise up and down by operation of a corresponding numeral type-key. A register-bar in which a pin is to be set must first be slightly advanced so that the pins therein come under their respective pin-setting bars. Then when a numeral type-key is operated the corresponding pin-setting bar is forced down to set the corresponding digit-pin in the register-bar which was thus advanced, said pin-setting bar passing between and thus avoiding the pins of the other register-bars which were not so advanced.

The step-by-step feeding movement of the typing carriage is used to advance the register-bars of a set seriatim for a pin-setting, said movements being translated into register-bar advancing impulses by means of a set of push-rods and engageable at one end by a typing carriage tappet and connected at the other end through a novel transposing mechanism to corresponding register-bars, it being understood that the transposing mechanism is necessary because the dial-wheels are read from left to right, the register-bars being similarly indexed from left to right, whereas the typing carriage engages the push-rods seriatim from right to left.

The card to be perforated has numerous hole-space columns and is divided into item-defining zones, the width of a zone depending on the number of denominational hole-space columns included therein. A nest of punches in the perforator is arranged in denominational columns, each including nine digit punches. Each punch-column has adjacent thereto a punch-selecting slide wherein a punch-operating plunger may be moved along the punch-column from a neutral position to a position opposite the punch which is to be operated. Said slides are connected to the aforementioned register-bars of the computing mechanism, and therefore select punches corresponding to the digits indexed in said register-bars.

The punch-selecting slides are spaced apart like the punch-columns, at say $\frac{5}{32}''$ intervals, whereas the register-bars are spaced at wider, say $\frac{1}{4}''$, intervals, the wider spacing of the register-bars being characteristic of the computing mechanism arrangement. The present invention provides links of novel design and arrangement to afford direct connections between a large number of narrowly-spaced punch-selecting slides and a corresponding number of wider-spaced register-bars, and to avoid interference between the converging connections, it being understood that a large number, say twelve, of slides and corresponding register-bars provides for card-zones of a corresponding number of columns.

A card to be punched is advanced zone by zone under the punches by means of a spring-propelled card-carriage having an escapement-device controlled by the typewriter denominational tabulating keys, so that operation of any one of said keys to advance a zone of a work-sheet in a typewriter to the printing point will also advance a corresponding card-zone into position under the punches. The card-carriage of the aforementioned Davis invention is a rod-like structure, and there are provided in the present invention improved means for mounting such carriage for endwise movement, improved means for retaining a card in said carriage for movement therewith, improved means for controlling the card-retaining means so that a punched card may be ejected and a new card fed thereto, and means for guarding said carriage and associated mechanism against shocks as it jumps ahead zone by zone or is returned by power, said latter means including a carriage speed governor and shock-absorbing devices at each end of the full range of card-carriage travel.

The present invention also provides an improved escapement dog-carrier for the card-carriage, and improved means for withdrawing said carrier preparatory to a power-driven card-carriage-return movement ensuing upon engagement of power-driven carriage-return mechanism for returning the typewriter-carriage. The escapement dog-carrier is thus withdrawn so that the spring-propelled carriage may advance and deliver the punched card therein to power-driven card-ejecting rolls which transfer said card to a receptacle, the card-ejecting advance motion of the card-carriage being utilized to set into operation power-driven card-carriage-returning mechanism which becomes effective as the punched card is presented to said ejecting rolls, various power-transmission shafts of the perforating mechanism being concomitantly set into operation by closing a switch, and thus starting a computing mechanism motor which is connected to also drive said transmission shafts. The return motion of the card-carriage is utilized to automatically call into action at the proper time power-driven mechanism which operates to feed a new card from a supply-stack to said carriage as it reaches the end of its return movement.

The aforesaid motor switch is closed by engagement of typewriter-carriage-return mechanism which said motor drives, and improved connections are provided as already stated, whereby the card-carriage escapement-dog-carrier is withdrawn concomitantly with the engagement of said typewriter-carriage-return mechanism. Thus engagement of said latter mechanism, to return the typewriter-carriage after writing a line of data for which a corresponding card is punched zone by zone, causes the punched card to be deposited in the aforesaid receptacle, causes the card-carriage to be returned, and causes a new card to be fed to the returned card-carriage.

The typewriter-carriage-return mechanism is automatically disengaged as it reaches the end of its return-movement, and the aforesaid switch is opened. An auxiliary switch is provided with connections which enable its closure to be effected through the withdrawal of the aforesaid dog-carrier and its opening to be effected when the card-carriage-return operation and new-card feeding operation are completed. Thus said auxiliary switch keeps the motor running to complete said latter operations regardless of an opening of the first-mentioned switch through possibly prior completion of a typewriter-carriage-return operation. Improved means are provided for thus opening and closing said auxiliary switch, which switch may be of the same structure and hence substantially a duplicate of the typewriter-carriage-return switch.

An improved main framework, in which the perforating mechanism is assembled, is provided and carries the aforesaid transmission shafts and their connecting and operating gears, the main operating gears being enclosed in a novel casing which may be supported at the end of said framework. Said framework has a top forming a table-surface on which a stack of supply cards may rest, and along which a new card may be advanced from said stack and then advanced zone by zone past the punches. Casings may be provided to enclose the punches and punch-selecting slides and associated mechanism, and may be assembled therewith, as will be shown, to form a unit which may rest on said framework.

A novel receptacle in which the punch-cards may be deposited is provided and includes a detachable device for quickly and easily withdrawing a pack of punched cards from said receptacle.

Means are provided for preventing the card punchings that drop through the die-plate from being caught in the mechanism, and include a chute under said die-plate which leads said punchings into a receptacle from which they may be easily emptied.

Novel bearings are provided for some of the transmission and control-shafts to provide for their easy assembly in the perforating mechanism.

The card-perforating mechanism is behind the combined typewriting and computing mechanisms and below the top of the typewriter. It is contrived therefore to arrange a mirror and an adjustable support therefor which will give a view of said perforating mechanism and the cards therein to an operator at the front of said typewriting and computing mechanisms.

The typewriting and computing mechanisms are supported on the usual main stand having a top platform on which rests the computing mechanism, and on which latter mechanism in turn rests the typewriter, said stand being built up of the usual rod or tubular members constituting legs for said platform and cross-members bracing said legs. A feature of the present invention is an auxiliary stand supporting the perforating mechanism at the rear of the computing mechanism. Said auxiliary stand harmonizes in appearance with the main stand, is designed for quick attachment and detachment to and from said main stand, and is also designed to be shiftable laterally of said main stand to provide for connecting the perforating mechanism to one or another set of the different sets of register-bars with which the computing mechanism may be provided as aforesaid, the aforesaid main framework of said perforating mechanism resting on said auxiliary stand.

From the supply stack of cards which rests upon the table-surface of the perforating mechanism main frame, the cards are advanced one at a time, and the present invention provides a one-card throat-device whereby only one card is advanced from the pack by a reciprocatory card-pushing member toward power-driven feed-rolls, which, in turn, advance it to the card-carriage. Said novel throat-device forms a one-card aperture between said table-surface and a throat-block suspended by screws from a fixed cross-bar and which may be adjusted toward and from said table-surface to regulate said aperture by turning said screws. Screws threaded into said cross-bar and bearing upon said throat-block may also be turned and thus co-operate with the first-named screws to adjust said aperture and hold the adjustment, said throat-block being in the form of an elongate rod with the aforesaid screws disposed near its ends. Improved means, which may be economically manufactured and assembled, are provided for mounting the reciprocatory card-pushing member.

The feed-rolls are arranged on two parallel shafts, the rolls on one shaft designed to abut the rolls on the other shaft, but being normally separated therefrom to a slight extent to permit movement of the card with the card-carriage, the rolls advancing a card from the supply stack in a direction transverse to the card-carriage movement, and in the present machine being disposed along the path of said card-carriage movement. One shaft is accordingly mounted between rock-arms carried by a rock-shaft which is called into action to bring the opposed feed-rolls together when a card is to be advanced from the supply stack, and to separate feed-rolls when they have advanced said card to the card-carriage. Means are provided for adjusting said rock-shaft for parallelism of the opposed feed-rolls.

Other features and advantages will hereinafter appear.

In the accompanying drawings,

Figure 1 is a sectional side elevation of the combined typewriting, computing and card-perforating mechanisms.

Figure 2 illustrates the usual escapement and carriage-propelling means for the typewriter-carriage.

Figure 3 is a top plan view of the card-perforating mechanism, showing the disposition of the parts as seen in such view.

Figure 4 is a perspective view, showing novel transposing mechanism, whereby the typewriter-carriage-actuated push-rods are connected in reverse order to the computing mechanism register-bars.

Figure 5:
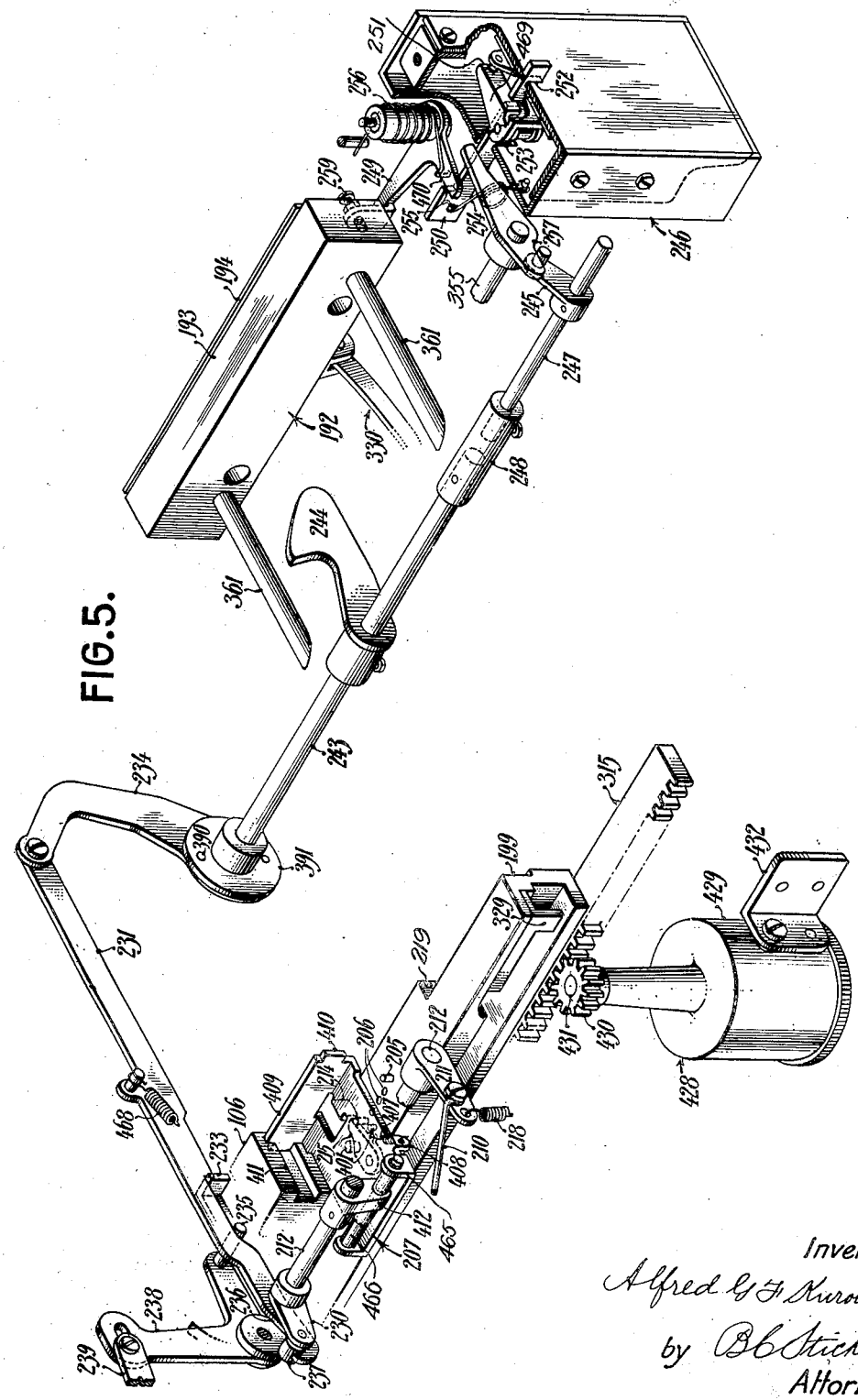

Figure 5 is a perspective diagram, showing details of the card-carriage, the escapement-mechanism therefor, the reciprocatory member for pushing a card from a supply-stack, and the means for controlling a motor-switch of the perforator. Said view also shows details of means for withdrawing the dog-carrier of the card-carriage escapement-mechanism, and also shows a speed-governor for the card-carriage.

Figure 6:
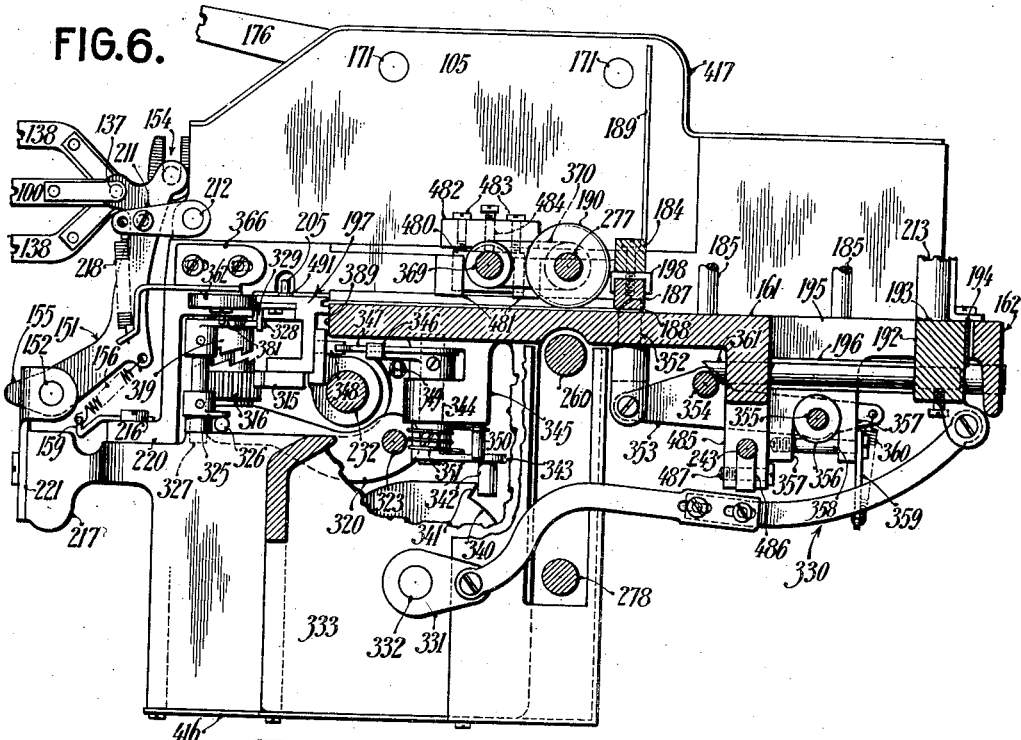

Figure 6 is a sectional side elevation of the card-perforating mechanism, showing means for reciprocating the card-pushing member, and means for returning the card-carriage. Other details of the perforating mechanism are also shown in said view.

Figure 7:
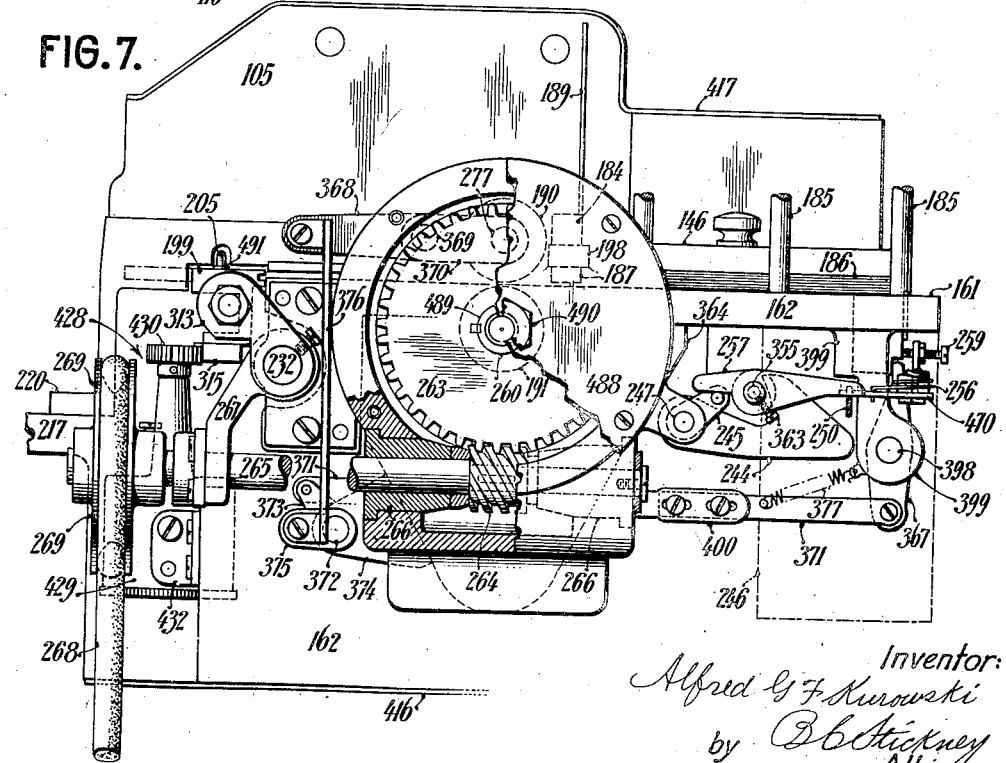

Figure 7 is a right-hand end view of the card-perforating mechanism, showing particularly details of the power-transmission mechanism for actuating the card-perforator.

Figure 8 is a bottom plan view of the perforating mechanism, showing how the mechanism below the main-frame top is arranged.

Figure 9 is a front elevation of the perforating mechanism, showing details of the card-carriage, the throat through which the card is pushed from a supply-stack, and means for ejecting a card from the carriage and depositing it in a receptacle.

Figure 10 is a sectional side elevation of the card-perforating mechanism, showing details of the punches, punch-selecting and punch-actuating mechanism, and also details of the card-carriage and carriage-returning mechanism. Said view also shows details of the connections between the punch-selecting slides and the register-bars.

Figure 11 is a sectional side elevation of the perforating mechanism, showing details of the means for withdrawing, preparatory to a carriage-return movement, the escapement-dog-carrier of the card-carriage escapement-mechanism.

Figure 12 is a perspective view, showing details of the casing and fixture wherein the punches and punch-selecting mechanism are retained.

Figure 13 is a top plan view of the connections between the punch-selecting slides and the register-bars, illustrating the manner of offsetting said selections.

Figure 14 is a perspective view of the card-carriage, showing details of said carriage, and particularly means for retaining a card therein.

Figure 15 is a perspective view taken from the rear of the machine, showing details of an auxiliary stand or frame for supporting the perforating mechanism, and the manner of supporting said stand or frame on the main stand of the machine for sidewise adjustment.

Figure 16 is a sectional elevation taken longitudinally of the perforating mechanism, showing details of the power-transmission mechanism and casings that enclose said mechanism.

Figure 17 is an inner end elevation of said casings of Figure 16, said end elevation bringing out certain details more clearly than Figure 16.

Figure 1 shows an Underwood-Hanson computing machine. Numeral-keys 30, through type-actions 31, cause types 32 to print against a platen 33 mounted upon an axle 34, journaled in the sides of the usual platen-frame 35, having a case-shift frame 36 and a case-shift lever 37. A letter-feeding carriage 38 moves to and fro upon rails 39 and 40, on typewriter-frame 41. In Figure 2, spring-drum 42 propels the carriage 38 having escapement-mechanism 43.

Registers which are conventionally indicated have dial-wheels 44, driven in one direction only by means of one-way connections to racks 45, formed on bars 46, which also carry settable pins 47. There are in each bar 46 nine pins, one for each digit. The lower ends of said pins 47 normally clear a bar 48, which reciprocates to and fro to move the bars 46, which will hereinafter be called pin-bars or register-bars. To set a pin 47, it is projected into the path of the general operator bar 48, the movement of the register-bar depending upon which pin is depressed. The return movement of the bars during which the dial-wheels 44 are held stationary, by reason of the aforesaid one-way drive and the usual detenting means, is also effected by means of the general operator bar 48, which encounters a projection 49 of each register-bar to return said bars against a stop-plate 50, having slots 51 that guide the bars at their rear ends. The general operator bar 48 returns the register-bars to within a short distance of the stop-plate 50, the return movement of each bar being completed by means of a spring 52, which co-operates with a nose 53 on said bar to effect the full return. When the bars are fully returned a gap 54 between each register-bar and the general operator bar permits each register-bar 46 to be moved endwise to bring its pins 47 into line with the pin-setting bars 55 of pin-setting frame 56.

Normally the pins 47 occupy positions in planes midway between said bars. Each pin-setting bar 55 is part of a parallel-motion linkage actuated by a transverse rock-shaft 57, having an arm 28 to engage an upper bar 29 of said linkage, the bars 55 and 29 being connected at their ends by the usual bell-cranks. There are one such shaft and linkage for each numeral-key, and each shaft has at its forward end an arm 58, whereby it may be rocked by stem 59 depending from the corresponding digit or numeral key and moving downwardly whenever said key is depressed.

The register-bars 46 are moved endwise one by one in denominational order to bring the pins 47 in line with the pin-setting bars 55 as the typewriter-carriage moves step by step through a predetermined zone. A register-bar having been brought into pin-setting position, one of its pins will be depressed by operation of a numeral-key, whereupon the typewriter-carriage escapes and takes another step in which the next bar is moved endwise, while the preceding bar, urged by the spring 52, returns to its normal position. For moving the register-bars endwise to pin-setting position, each register-bar has an individual train including a jack 61 and a push-rod 62. The typewriter-carriage moves from right to left, and the register-bars 46 must be indexed in order from left to right. To transpose the impulses from the rods 62, there is used a series of transposing levers 65, each having an arm 66 which engages one of the rods 62 and an arm 67 which engages the corresponding register-bar 46, each arm 66 being connected to a corresponding arm 67 by a cross-bail 64.

For determining which portions of the carriage-movement are to cause pin-setting, there is provided for each work-sheet zone for which pins are to be set one or more selector-dogs 68. In accordance with the location of the work-sheet zones and of the set or sets of jacks 61 to be engaged, said dogs 68 are settable along rods 69 and 70 on the typewriter carriage. Tappets 71 on the selector-dogs 68 engage the forward ends of the jacks 61 to rock said jacks about pivots 72. There is provided a set of jacks 61 for each register, and the array of forward ends of one set of jacks is offset from the array of forward ends of other sets of jacks, the tappets 71 being correspondingly offset so that a selector-dog may only co-operate with its own set of jacks. A frame 75, including a roll 76 having conically-shaped ends, is used for supporting and upholding the rearward end of a selector-dog 68, each dog having a conical roll 77 which bears upon said roll 76. There are one of said frames 75 and roll 76 under each set of jacks, and a selector-dog is raised to operative position as its roll 77 passes over one of the frame-rolls 76 during the carriage travel. The frames 75 are mounted upon a rock-shaft 78. An arm 79, projecting from the case-shift frame 36 which swings about the axis of a rod 74, engages an arm 79ª of said rock-shaft 78, to rock said shaft 78 and withdraw the dog-supporting frame-rolls 76 when the platen is moved to upper-case position. Also, depression of any tabulator-key 73 and tabulating key-lever 80, to raise a tabulating stop 81, causes said rock-shaft 78 to be rocked by means of an arm 82 which is operatively connected to said rock-shaft by means of a link 83 and an arm 84, which arm 84 extends from said rock-shaft, said arm 82 extending from the universal bar-shaft 85 which co-operates with the tabulating stop 81, there being a stop for each denomination, the several stops 81 co-operating with counter-stops 102 settable along the usual notched rod 64ª of the typewriter-carriage. The rock-shaft 78 may also be rocked to drop the selector-dogs 68 whenever a non-add key (not shown) is operated; said key being effective to swing a partly shown lever 86 engaging an arm 87 of said rock-shaft 78.

The computing mechanism is in a casing 88 which supports the typewriter and is in turn supported upon a plate 89 which is the top platform of the supporting stand 60, Figures 1 and 15, for the whole mechanism.

The general operator bar 48 spans two racks 90, one at each side of the casing 88, and is supported between plates 91 fastened to the sides of said racks. Driving connection is made to the left-hand rack at 92 (Figure 1) by a reciprocatory member 93 driven by a crank 94, housed and guided within a transmission casing 95. Said transmission casing 95 also houses reducing gearing and a clutch, neither of which is shown, and whereby said crank may be connected to an electrically-driven motor 96. The clutch includes a pin 97 projecting above the transmission casing 95 and having endwise movement to condition the clutch to connect the crank 94 and the motor 96, that is to say, momentarily raising the pin 97 releases a clutch-member and causes the crank to revolve, the return of the pin 97 causing the pin to intercept said clutch-member, to effect the arrest of said crank 94 after one revolution.

A manual key 98 swings a lever 99 downwardly to rock a transverse lever 101, the inner end of which engages the clutch-pin 97, said lever 101 being pivotally supported upon the stand-plate 89.

A computing machine cycle may also be initiated automatically as the typewriter-carriage leaves a computing zone, tripping means being actuated whereby the withdrawal of the clutch-pin 97 is effected. Said tripping means, partly shown, include the settable stops 102, each provided with a tappet to rock a lever 104. The rocking of said lever causes actuation of the clutch-pin 97, by means shown in the aforesaid co-pending application of Davis. The tabulating stop 102 may rock the lever 104 and be clear thereof in one step of the typewriter-carriage, the pin 97 being raised just long enough to release the aforementioned clutch-member.

During a computing machine cycle all digits set up in the register-bars 46 are accumulated during the forward movement of said bars. All pins 47 that were set are restored toward the end of the return movement of said bars, by means of a plate 136, which, by means of the linkage set forth in the aforesaid application of Davis, is constrained to move upwardly with its surface always parallel to the lower edges of the register-bars; the upward movement of said plate serving to restore said pins. The raising of said plate 136 is effected as the racks 90 approach the end of their return movement, said plate dropping to reassume its normal position at the end of the return movement of racks 90.

For returning the typewriter-carriage 38 by power, a rack 110 on said carriage meshes with a pinion 111 rotatable on or with a shaft 112 journaled in a bracket 113 attached to the typewriter-frame 41. Said shaft 112 is driven by the motor 96, through a pulley 114 on said shaft, a belt 115 and a pulley 116 located below the plate 89 of the supporting stand. A driving pulley 117 on the motor-shaft, Figure 1, is connected to the pulley 116 by a jack-shaft 118, a pulley 119 in line with the motor-pulley 117, and a belt 120. Thus, the shaft 112 rotates when the motor 96 rotates, and rotation of said motor may thereby serve to return the typewriter-carriage. The carriage-returning pinion 111 is normally operatively disconnected from the shaft 112 and is movable endwise therealong to effect connection with a driving member 121 which is keyed to said shaft. As the pinion 111 is slid toward said driving member 121, clutch-teeth of the driving member and pinion interlock to drive the carriage when the shaft 112 is rotated.

For moving the carriage-returning pinion 111 into and out of engagement with the driving member 121, there is the usual key-controlled spring-pressed train of linkage 122, one end of which engages a groove 109 in the pinion 111, and the other end of which is a latch-bar 123 having a notch 124 normally caught in a front plate 125 of the typewriter, said plate having a slot through which the latch-bar passes. A spring 126 urges the latch-bar 123 rearwardly, and, to release said latch-bar, its front end is raised to cause the holding edge of the notch 124 to be freed of the plate 125, whereupon the pull of the spring 126 causes the engagement of the carriage-returning pinion 111 with the driving clutch-member 121. A carriage-return key 127 on a spring-pressed lever 128 serves to raise the latch-bar 123 to initiate a power-driven carriage-return movement. Said carriage-return movement is terminated automatically as the carriage reaches the usual right-hand carriage-stop, not shown in detail, but which has associated therewith a dog 129 which, in order to be shiftable with said carriage-stop, is splined to a rock-shaft 130 for rocking said shaft, at the right end of which is an arm 131. As a cam-faced tappet 132 mounted upon the typewriter-carriage encounters said dog 129, the shaft 130 and arm 131 are rocked to withdraw the carriage-returning pinion 111 from the driving member 121, the withdrawal being effected by means of linkage 133 which connects said arm 131 to the aforesaid train of linkage 122, to move the carriage-returning pinion 111.

The motor 96 is not run continuously, but only when the general operator bar 48 is to be actuated to accumulate an item; or when the carriage is to be returned. For starting the motor when an item is to be accumulated, there is, within the transmission-casing 95, a switch (not shown) controlled by engagement of the clutch within said casing 95.

For starting the motor when a carriage-return movement is to be initiated, and for maintaining the operating circuit for said motor independently of the switch in the transmission-casing when a computing machine cycle and carriage-return movement are initiated simultaneously, there is provided another switch 134, Figure 1. Said switch 134 is closed by a controlling link 135 extending from said switch to the train of linkage 122 and enabling said linkage to control said switch. Said controlling link 135 by its endwise displacement effects closure of the switch 134 to start the motor when the carriage-returning clutch 111—112 is closed and also opens said switch when said clutch is opened.

The improved card-perforating mechanism and novel means connecting it to the computing mechanism will now be described.

As fully set forth in the aforementioned co-pending application of Davis, the computing mechanism may have a number of registers each having its own set of register-bars 46. The machine may have four such registers which are herein conventionally represented by their respective sets of pin-setting rods 62, see Figure 15.

The perforating mechanism being connected to only one set of register-bars, as will be understood from Figure 3, other sets of register-bars are omitted from said Figure 3 or similar figures, to simplify the drawings.

It is immaterial to the present invention whether or not the register actuated by the illustrated register-bars is used as a live register to accumulate items of the same character, such as amounts. If the items to be punched are mixed items, as for example classification numbers mixed with amounts, the amount accumulated will be some nondescript sum. Since the register-bars might also be utilized for accumulating amounts, the register actuated by said bars may be included in the mechanism. While writing the items on the work-sheet, the card-perforating mechanism is controlled to the end that some or all of the items written on the work-sheet will be recorded in the record-card by means of the perforations 143. In the card-perforating mechanism, a gang or nest of punches 145 is arranged in denominational columns, each column having nine punches, one for each digit.

Punch-selecting slides 147, over the denominational punch-columns, carry punch-actuating plungers 148, which may be made to register with any one of the several punches of their respective punch-columns by moving slides 147 endwise. The lower end of each plunger 148 normally clears the upper ends of the punches and is held clear by means of a spring 149 which normally holds the plunger up so that a horizontally-bent portion 150, forming said lower end, abuts the slide 147.

The intervals or spaces which define the extents of movements of the register-bars being somewhat less than the punch spacing lengthwise of the punch-columns a multiplying leverage may be used to connect each punch-selecting slide 147 to the register-bar 46 which is to move said slide, and said leverage includes a lever 151 swinging about a fulcrum-rod 152, said lever being connected to the slide 147 at a point further from the fulcrum-rod than is the point to which is connected a link 153 extending from said lever to the corresponding register-bar. On account of the arc which the first-mentioned point describes as the lever 151 swings about its fulcrum-rod, said lever is connected to its slide 147 by a pin-and-slot connection 154.

The transverse spacing of the punch-columns and slides 147 corresponds to the spacing of the denominational card-columns in which perforations 143 are to be entered. In the arrangement of the register-mechanism, the transverse spacing of the register-bars 46 is greater than the above-mentioned transverse spacing of the slides 147. The present invention provides a novel arrangement whereby a large number of slides 147 may be directly connected to a corresponding number of register-bars in such manner that adjacent register-bars, slides and connections cannot interfere.

It will be understood that the employment of a large number, say twelve, of register-bars and slides 147 provides for card-zones of corresponding width. The bars 46 being differently spaced from the slides 147, and having individually and largely different extents of movements and also having their respective ends, between which the connection is to be made, normally in transverse alignment, it will be understood that the connections must be arranged to avoid the aforementioned interference. To this end, the links 153, connecting those register-bars 46 and slides 147 which are sufficiently out of alignment to cause such interference, may be offset, as indicated by the crooks 138, Figures 1, 10, 13 and 15.

By making alternate links with the crooks 138 to one side of a straight line joining the link-ends, while the links intermediate of said alternate links have crooks 138 on the opposite side of said straight line, interference of adjacent members is avoided in a simple manner. It will be understood that the crooks include the link-portions which could collide, if said crooks were not alternately arranged, as shown, to afford wider separation of said portions. Where a register-bar 46 is not sufficiently out of alignment with its corresponding slide 147 to cause the aforementioned interference the link 153 may be straight, that is, without the crooks, as indicated at 100, Figures 10 and 13, which show that such straight links may be employed for connecting some of the middle register-bars to their respective slides 147.

The links are bent laterally in such manner as to also avoid interference with the levers 151. It will be plain that such interference could occur between a lower crook and an adjacent lever 151. To avoid this the bends in the link are made at such points $a$, $b$, that when the links are in normal position, said points are ahead of and beyond the range of movement of said levers 151, see Figure 13.

Each link 153 is pivotally connected at one end to its respective register-bar at 139, and at its other end said link is connected to its respective slide 147 by means of the movement-multiplying lever 151 to which it is pivotally connected at 137, the lever 151 being connected to said slide by the aforementioned pin-and-slot connection 154.

The slides 147 are mounted for endwise movement in a casing 105 which may rest on a lower fixture 106 in which the punches 145 may be retained and to which a die-plate 160 for said punches may be secured. Said fixture 106 may include a box-like extension 107 to enclose the rear portions of said slides, as indicated in Figures 10 and 12.

A perspective view, showing said casing 105 and lower fixture 106, is shown in Figure 12. The slides 147 are spaced laterally by means of slots 108 in end walls of said casing 105, and may be provided with elongated slots 141, the edges of which may ride upon individual rollers 142, bearing upon cross-rods 164 retained between the sides of said casing 105. For retaining and guiding its punch-depressing plunger 148, each slide 147 may have bent-over and slotted tabs 165 in which said plungers may be guided and be retained by a pin 492.

The die-plate 160 may be secured to the lower fixture 106 as by screws 200 and which fixture in turn may be secured to the slide casing by screws 201. The aforesaid slide-enclosing extension 107 of the lower fixture 106 may rest directly upon main framework 162 of the mechanism and may be secured thereto by screws 216. The front of the lower fixture 106 may have a downwardly-extending portion which may rest upon a ledge 217 of said main framework, said lower fixture being provided with a ledge 220 which abuts said framework ledge 217. Thus said extended front of the lower fixture 106 serves to enclose the clutch mechanism seen in Figure 10, and which will be described further on. The main framework ledge 217 may be extended forwardly so that there may be attached thereto a plate 221, in which the fulcrum-rod 152 for the multiplying levers 151 is retained. For spacing said levers 151 laterally, said plate may have slots 222 to receive extensions 155 of said levers for spacing the latter.

To aid in resisting overthrow, the slides 147 may be spring-pressed toward their normal positions, and to this end the multiplying levers may be provided with spring 156, one end of each spring being attached to a lever and the other end of each spring being attachted to a common spring-plate 159 which may be secured as indicated in Figure 10.

The punches 145 are retained and guided by plates 157 and 158 which are separated by the portion of the lower fixture 106 to which they are attached, said portion having a rectangular opening 144 to clear the punches, see Figure 12.

The slide casing 105, the lower fixture 106 and the die-plate 160, all attached together, form a composite unit which may rest in a channel 173 sunk below a table-surface 161 of the aforesaid main framework 162, so that the top surface of the die-plate is substantially flush with said table-surface, and across which the cards are fed, as will presently be described.

The lower punch-guiding plate 158 is separated from said table-surface by a gap 163, through which the card-guiding punch may be passed.

For retraction after punching, each punch is provided with a spring 166. Said springs react against the lower punch-guiding plate 158 and against collars 167 of their respective punches, the opposite shoulders of said collars striking the upper punch-guiding plate 157 when the punches are fully retracted.

When the register-bars 46 have reached the limit of their forward movements, the punch under each plunger 148 then corresponds to the pin or digit which was indexed in the corresponding register-bar. At the end of the forward movements of the register-bars, the crank 94, which drives the general operator bar 48 is at dead center, and the motion of the slides 147 at this instant is zero. It is feasible, therefore, on account of said zero-motion, to depress the punch-operating plungers at this time to punch the card. The crank 94 as it approaches and leaves said dead center actuates a train of plunger-depressing mechanism having at one end a downwardly movable plate 168 whose surface includes an area within which the plungers 148 move, the other end of said train terminating in a lever 169 pivoted on the transmission-casing 95 and carrying a roll 170 which is engaged by the end of the crank 94 as said crank approaches and leaves the aforesaid dead center.

For direct up-and-down movement, the plunger-operating plate 168 is actuated through a parallel-motion linkage, including two shafts 171 having at each end thereof a bell-crank 172, and journaled in the sides of casing 105. The plunger-depressing plate 168 is connected to the bell-cranks 172 by pintles 174, and links 175 connect opposite bell-cranks as shown. Said linkage includes an operating arm 176. A jack-shaft 177 transfers the line of action of said train of plunger-depressing mechanism from a point opposite the lever 169 to a point below the arm 176. Said jack-shaft 177 has opposite the lever 169 a downwardly-extending arm 179 connected by a link 180 of adjustable length to said lever 169, and also has an arm 181 below the arm 176 and connected thereto by a link 183. The jack-shaft 177 is journaled in bearings 178 formed at the front of the main framework 162. A spring 182 retracts the train of plunger-depressing linkage and holds it in normal position in which the plate 168 abuts a flat formed on one of the shafts 171, see Figure 10.

All the punches which are selected by the plungers 148 are caused to punch simultaneously by operation of the plate 168, and a card is therefore punched by zones, all the columns of a zone in which digits are to be recorded having the perforations effected therein simultaneously in one operation of the plunger-depressing plate 168.

The means, and the manner of operation thereof, whereby a card is taken from a supply-stack and fed transversely of the punches zone by zone, will now be described. A supply-stack 186 of blank cards is supported on the table surface 161 of the main framework 162. The lateral and rear sides of the stack may be retained by pins 185 projecting upwardly from the table surface 161.

A novel throat-device includes a throat-block 187 suspended above the table surface 161 from a cross-bar 184 by screws 204 to form between a sharp and slightly-relieved or backed-off edge of said block 187 and said table surface an aperture 188 limited to permit the passage of only one card at a time. The cross-bar 184 extends beyond the sides of the supply-stack and is secured to fixed abutments 198. The length of the throat block 187 may be limited as indicated by the dotted lines representing the ends of said block in Figure 3. The aforesaid screws 204 are threaded into said block 187 near its ends, but have clearance holes in the cross-bar 184 so that by turning said screws 204 the throat-aperture 188 may be adjusted. Set screws 208 threaded into the cross-bar 184 alongside of the screws 204 bear upon the throat-block and co-operate with the latter screws to adjust said aperture and also to hold the adjustment. Thus it will be seen that loosening one screw and tightening the other screw at either end of the throat-block causes said end to be raised or lowered, depending upon which screw is loosened and which screw is tightened. Inasmuch as either end of the throat-block 187 may be thus raised and lowered by means of the screws, the aperture 188 may be minutely adjusted.

Stack-retaining fingers 189 may be attached to the cross-bar 184 beyond the ends of the throat-block to co-operate with the pins 185 in retaining the supply-stack. A weight 146 serves to press the card-stack down to insure feeding of the bottom card. The cards may each have a corner cut obliquely for determining that all cards lie the same way in a stack. To insure that the cards are placed properly in respect to the card-perforator, a key-rod 213 is provided which will permit placing the cards in the perforator in one way only, namely, with the oblique card corners against said key-rod.

The cards are slid one at a time from the bottom of the supply-stack and pushed through the throat-aperture 188 to be gripped by upper and lower feed-rolls 190 and 191 which continue the forward movement of the card in a manner to be described. For pushing one card at a time toward said feed-rolls, a member 192 is mounted for reciprocatory movement and has a surface 193 slightly above, say .005", the table surface 161. Secured to the rear edge of said reciprocatory member 192 is a picker-knife 194 having a shear-like edge which projects above said surface 193 so that only one card at a time may be picked or pushed from said stack during the forward movement of said member 192. The framework 162 has an opening 195 for the reciprocatory card-pushing member 192, and said opening is spanned by spaced-apart pins 196 which form simple yet efficient means for retaining and guiding said reciprocatory member, said pins 196 being removably retained in easily machined holes of said framework 162, and said member having holes forming slide-bearings on said pins 196. Means for reciprocating the member 192 will be described later.

A card-carriage 199 for moving the card zone by zone past the punches after said carriage receives a card from the supply-stack is in the form of a rod having several attachments and formations to be described.

The carriage 199 is mounted for endwise movement on a rod 232, said carriage having bearings 386 which bear upon said rod 232. For lightness, the carriage 199 may have a channel section, opposite sides of the channel section facing upwardly and, downwardly respectively, the cross side of said section facing rearwardly. A slot 219 extends along the carriage 199 to receive and retain the edge of a card. A novel card-pushing spur 223 is adjustably attached to the rear side of the card-carriage and has an inclined surface $s$, Figure 14, to engage and push upon a corner of the card. By inclining said surface, as shown in Figure 14, escape of said corner of the card is prevented. Said spur may be secured to the carriage by screws 258 and may have elongated screw-holes 289 so that said spur may be adjusted. To aid in retaining and guiding the carriage 199, two rollers 362 may be provided to bear against the front upper edge of said carriage, and may be mounted on brackets 366 secured to the main framework 162, as indicated in Figure 3. Said rollers prevent forward tilting of the carriage about the carriage-guide rod 232. To prevent rearward displacement about the rod 232, the carriage may bear against a surface 389 which may extend the full length of the main framework 162 and may include the front of the die plate 160. When the carriage receives a card from the supply-stack, said carriage is held by means to be explained, so that the spur 223 is just to the right of a new card which is being advanced from the supply-stack, and which means, when a new card is in position, release the carriage to the control of escapement mechanism controlled by the typewriter tabulating keys. Said escapement mechanism advances the carriage step by step under the pull of a spring motor 202 and draw band 203. Thus, when the typewriter tabulating keys space the typewriter-carriage for a new work-sheet zone, the card may also be tabulated to a corresponding new zone. As will be shown, the upper feed-roll 190 is raised slightly to free the card to move endwise with the card-carriage after having been advanced by the feed-rolls into position in said carriage.

The card-carriage escapement mechanism includes suitable stop-pins 205, which may be set along a series of holes 206 in the card-carriage 199, said holes being spaced like the denominational card-columns. Said pins 205 co-operate with a vibratory dog-carrier 207 of novel construction. Said dog-carrier is formed of a sheet-metal blank on which is directly formed a holding dog 214, see Figure 5. A pivoted stepping dog 215 vibrates between stops 401 projecting from said dog-carrier 207, and normally holds the carriage by engaging a stop-pin 205. When the dog-carrier 207 is moved forwardly the stepping dog 215 escapes, while the holding dog 214 momentarily holds the card-carriage. Upon rearward movement of the dog-carrier, the holding dog is withdrawn from the pin 205 which it engaged, and the escaped dog 215 now behind said latter pin may check the card-carriage by engaging the next pin 205 thereon. The stepping dog escapes, as just mentioned, by means of a spring 407, one end of which may be attached to a downwardly-projecting ear 408 of the dog-carrier, the other end of said spring being attached to said stepping dog. Said dog-carrier 207 is guided for forward and rearward reciprocatory movements, and has therefore an upturned rear end 409 having tongues 410 which fit and slide in grooves 411 formed in the fixture 106, Figure 5. A shaft 212 reciprocates and also guides said dog-carrier by means of a downwardly-extending arm 412 from which is suspended the forward end of said dog-carrier, which may have ears 465 spanned by a pintle device 466 passing through the end of said arm 412.

An arm 211 fast to the shaft 212 is connected by a link 210 through a pin-and-slot connection 209 to the arm 82 which is vibrated by the universal member of the typewriter tabulating mechanism. Thus operation of any tabulating key oscillates the shaft 212 to reciprocate the dog-carrier 207, a spring 218 co-operating to effect said oscillation by pulling on the arm 211. The escapement actuating shaft 212 is journaled in bearings 467 formed on the front of the casing 105 that supports the punch-selecting slides 147, see Figure 12.

The manner of setting the stop-pins 205 is fully set forth in the aforesaid co-pending application of Davis. Briefly stated, a pin 205 is set for every card-zone in which perforations are to be effected. If the typewriter-carriage is to be tabulated without moving the card-carriage an "idle" pin is set to hold the card-carriage while the typewriter-carriage alone advances through operation of a tabulating key. When the typewriter tabulating key is operated a corresponding typewriter tabulating stop 81 is elevated into the path of the counter-stops 102 on the typewriter-carriage. The automatic cycle initiating lever 104 is so located that it is displaced by a counter-stop 102 when said stop passes beyond the field of the stops 81, or, in other words, when the last figure of an item has been typed, the lever 104 is automatically vibrated by a counter-stop 102 to initiate a computing machine cycle. During said cycle, which may also be initiated by operating the manual key 98, the register-bars 46 advance according to the pins 47 which were set by typing the individual digits of said item. Said bars 46 may advance to individual different extents and thus control the selection of the punches in the different punch-columns. During said cycle, the punch-operating plate 168 is actuated, causing the selected punches to penetrate the card. The perforating mechanism is thus operated to punch for every zone of the card for which a stop-pin 205 has been set. After each card-zone is punched a new zone is automatically brought into position under the punches when the typewriter tabulating key is operated to advance the typewriter-carriage. When the card has been punched in the required number of zones, the card-carriage 199 is advanced to present the card therein to card-ejecting rolls 224 and 225. The pins 205 are so set that the card-carriage is stopped in each zone with the units card-column of said zone under the units column of punches. Thus, inasmuch as the dog-carrier 207 is operated through the universal bar of the typewriter tabulating mechanism, the card-carriage is properly tabulated irrespective of the denomination of the typewriter tabulating key operated.

Return of the card-carriage is to be effected when the typewriter-carriage is returned. Inasmuch as mechanism for returning the car-carriage by power is called into action, as will be shown, by an advance of the card-carriage to eject a card, such advance is initiated by operating the carriage-return key 127, or, in other words, by engaging the typewriter-carriage-return mechanism, which, by well-known means, may also be engaged automatically as the typewriter-carriage reaches a line-end position.

For advancing the card-carriage 199 to deliver a card to the card-ejecting rolls 224—225, the escapement-dog carrier 207 is drawn forwardly, so that both the holding dog 214 and the stepping dog 215 are withdrawn from the stop-pins 205. By thus withdrawing both dogs the carriage not only advances to present the card to the ejecting rolls, but interference of the stop-pins 205 with said dogs is avoided in the return movement of said carriage, said dogs being kept withdrawn until all the stops 205 have passed. As the card-carriage advances for ejecting a card, card-carriage-returning mechanism is automatically set into operation in which it is driven by the computing mechanism motor 96. Mechanism for feeding a new card into position as the card-carriage reaches the end of its return movement is also called into action, said card-feeding mechanism being also driven by said motor 96. Before describing said card-carriage-return and card-feeding mechanisms and the improved means whereby said mechanisms are called into and out of action, there will now be described the means whereby the dog-carrier 207 is drawn forwardly as a result of engagement of the typewriter-carriage-returning mechanism. The shaft 212 that withdraws the dog-carrier 207 has fast thereto an arm 230 which may be displaced by the endwise movement of a cam-slide 231 urged forward by a spring 468 and normally restrained by means of a latch-device 233, Figure 5. For endwise movement said slide 231 is pivotally connected at its rearward end to an arm 234, which may retract said slide. At its front end said slide rests upon a pin 235 displaceable upwardly to release said slide from its latching device 233 for forward movement in which a cam 236 at the front of the slide displaces the arm 230, which may carry a roll 237 for engagement with said cam. It will be seen then that as the slide 231 is released the dog-carrier 207 is withdrawn and that the carriage advances by the pull of its spring-motor 202 until the leading edge of the card encounters the card-ejecting rolls 224, 225, which have been set in motion as will be described. The pin 235 whereby the slide 231 may be released is on a bell-crank 238, which may be spring pressed in normal position, said bell-crank being pivotally mounted on the side of casing 105. For actuation of said bell-crank 238 by engagement of the typewriter-carriage-return mechanism the endwise movement of the bar 135 which controls the switch of said mechanism is used. Connection between said bar 135 and the bell-crank 238 is made by a link 239 from said bell-crank 238 to a lever formed by arms 240 and 241 connected by a cross-shaft 242 pivotally mounted and supported at the rear of the typewriter, the end of the arm 240 being opposite the end of said switch-bar 135 of the typewriter-carriage-return mechanism. Thus it will be seen that engagement of said typewriter-carriage-return mechanism will cause the dog-carrying member 207 to be withdrawn and the card-carriage 199 to be advanced for ejecting a card. The dog-carrier 207 remains withdrawn until the slide 231 is retracted, the roll 237 of the carrier withdrawing arm resting meanwhile upon the camming edge of the slide 231. The arm 234 which supports one end of the slide 231 is fastened to a rock-shaft 243 which may connect said arm 234 to a cam-arm 244, whereby the slide 231 may be retracted, and which shaft may also connect said arm 234 to an arm 245 capable of closing a motor-starting switch 246. The slide 231 may pass through openings 226—227 in the rear and front walls of casing 105 and the opening in said front wall may locate the front end of said slide sidewise. The latch 233 may project inwardly through an opening 228 in the side wall of said casing and may be secured to said wall. Another opening 229 clears the pin 235. The shaft 243 includes an extension 247 connected to said shaft by a coupling 248 for convenience of assembling.

The motor-starting switch 246 on the card-perforating mechanism is auxiliary to the motor-starting switch 134 for the typewriter-carriage-return mechanism and keeps the motor 96 running in case a typewriter-carriage-return operation is completed, and said switch 134 opened before the card-carriage-return and card-feeding operations are completed. As will be shown, the completion of the card-feeding operation follows completion of a card-carriage-return operation, and the switch 246 may therefore be opened at the end of the return movement of the reciprocatory card-pushing member 192 which may engage and displace a bell-crank 249 pivotally mounted on the under side of the main framework top. Such displacement of said bell-crank 249 retracts a spring-pressed rod 250 and enables said rod to separate a pair of switch-contacts 251, one of which is on a swingable arm 469 which said rod may engage. Said rod 250 is retained in slots 252 and 253 in opposite walls of a switch-casing, as shown in Figure 5, one end of said rod 250 resting on the bottom of slot 252, the bottom of the other slot 253 being lower to afford clearance for depressing the end of the rod engaged by the bell-crank 249, said end of the rod being urged upwardly and also endwise to close the contacts by a spring 254. As the end of said rod 250 is depressed, a latching edge 255 thereon escapes from said bell-crank and the rod urged by the spring 254 moves endwise to close the contacts 251. The switch 246 is closed when the card-carriage is advanced to eject a card, and, to this end, the aforementioned arm 245 on shaft 243—247 depresses the end of said rod 250 by means of an intermediate lever 257. In the different operations of the perforating mechanism which now take place, the card-pushing member 192 advances at the proper time and then returns and in its advance movement engages the cam-arm 244 to rock the shaft 243—247 and thereby release the switch-rod 250 from the pressure which lowered its one end. As the card-pushing member 192 advances, the bell-crank 249 is rotated by a spring 256 so that its rod-retracting arm 470 is ahead of the latching edge 255 of said rod 250 again and which edge upon retraction of the lever 257 is brought opposite the rod retracting arm 470 by spring 254. As the card-pushing member 192 completes its return movement it engages an adjustable screw 259 of said bell-crank 249 and rotates the latter to retract the rod 250 and thereby separate the contacts 251. By adjusting the screw 259 the point of the travel of the card-pushing member 192, where said bell-crank 249 is engaged, may be closely determined.

As the motor 96 starts rotating, various transmission-shafts of the card-perforating mechanism are set in motion and at the proper time are connected and disconnected to and from card-carriage-return mechanism and card-feeding mechanism. Said transmission-shafts include a main shaft 260 journaled at one end in the main framework 162 at 261, the other end of said shaft being journaled in a casing 262 (Figures 7, 8 and 16) which encloses a worm-wheel 263 fast on said shaft 260 and driven by the motor 96 through a worm 264 fastened to a transverse shaft 265 journaled in bushings 266 of said casing. A bracket 267 supported by the card-carriage guide-rod 232 supports said transverse shaft 265 against the pull of a belt 268 connecting said shaft 265 to the parallel motor-shaft 471, said belt running on pulleys 269—270.

The casing 262 may be extended to enclose other transmission-gears, and, to this end, may form one side of a casing 271 to which the casing 262 may be secured by screws 272, Figure 16. The casing 271 may have a bracket 273 for attachment to the under surface of the main framework top by screws 274.

Upper feed-rolls 190 and lower feed-rolls 191 pick up the card after it has been pushed forwardly from the supply-stack. The lower feed-rolls 191 may be fastened to, or may be part of, the main transmission-shaft 260, and the upper feed-rolls 190 may be fastened to a shaft 277. A shaft 278 is utilized for reciprocating the card-pushing member 192. For driving the shafts 277 and 278 the main shaft 260 has fast thereto a gear 279 which drives the shaft 277 directly through a gear 280 fast to said shaft 277. The main shaft-gear 279 drives the shaft 278 through an intermediate gear 281 which meshes with a gear 282 fast on said shaft 278, said intermediate gear rotating on a stud 283 of the casing 271. One end of the shaft 278 is journaled in said casing 271 which serves to enclose gears 279, 280, 281 and 282. By means of the casings 262 and 271 all the main transmission-gears are enclosed and may be surrounded with lubricant.

The upper card-ejecting rolls 224 are spring pressed against the lower card-ejecting rolls 225 which are fastened to a cross-shaft 285 journaled in ears 286 depending from the under side of the main framework top. As herein shown, said ears are separated by a space in which is fitted a collar 287 fast to said shaft 285 for locating said shaft longitudinally, the sides of the rolls 225 preferably clearing said ears 286 and openings 275. Said cross-shaft 285 is driven by the main shaft 260 through bevel gears 288, one of which may be fast to the main shaft 260, the other bevel gear being secured to the shaft 285 by means of a pin which also secures the adjacent ejecting roll 225 which surrounds the hub of said other bevel gear, as indicated in Figure 8.

The upper card-ejecting rolls 224 rotate on the ends of arms 290 spaced apart and pivotally mounted in a bracket 291 attached to the table surface 161 of the main framework at 292 outside of the path of the card movement, and having an extension 293 reaching over said path of card movement to support the arms 290. Each of said arms may have a toe 294 backed by a spring 295, which, in turn, is backed by an adjustable screw 296 threaded into the hole which contains said spring, see Figure 9, said arms being retained in slots 297 opposite said holes, said slots having a transverse pivot 298 for the roll-carrying arms 290.

As has already been stated, the card is pushed along with the card-carriage by means of the card-carriage spur 223 pushing upon a corner at one end of the card. A shiftable card-retaining piece 299 for the other end of the card is of novel construction and has a face 300 which may abut the corner of the card to retain said card in the card-carriage 199. Said piece 299 is slidable up and down so that it may be withdrawn when a card is to be ejected and restored again after a new card has been fed to the card-carriage. Said retaining piece 299, therefore, slides against a surface 301, Figure 14, of the card-carriage 199 and is retained by means of a shouldered screw 302 passing through an elongated slot 303 of the retaining piece. A spring-pressed detent 304 mounted on a spring-arm 305 engages detent-notches 306 of said retaining piece to hold it in either position, said spring-arm being secured to said card-carriage 199 and also serving to press said retaining piece to the surface 301 against which it slides up and down. The card-retaining piece 299 is depresed downwardly to free the card as the card-carriage advances toward the card-ejecting rolls by a cam 307 which may be secured to the main framework, said cam engaging a nose 308 on the retaining piece 299 as the card-carriage advances and forcing said retaining piece down far enough so that the detent 304 slips into the upper detent-notch 306.

Concurrently with initiating a card-ejecting advance of the card-carriage, rotation of the card-ejecting rolls 224, 225 is started through closure of the auxiliary switch 246, as hereinbefore stated, so that when the advancing edge of the card to be ejected encounters said rolls it is caused to be withdrawn from the card-carriage which is arrested by striking a resilient bumper in the form of a spring-pressed plunger 309 located in the path of the carriage movement. Said plunger 309 may be retained in a bracket 310 secured on an extension of the card-carriage guide-rod 232. A shank of said plunger 309 slidingly fits a hole in said bracket and may be reduced so that a bumper-spring 276 may be wound therearound and be retained within said hole. As indicated in Figure 3, said shank may carry at its outer end adjusting nuts 311 for regulating the resiliency of the bumper and also the position of its face. A similar bumper 312 is at the other end of the path of card-carriage travel for checking the return movement of said carriage and is retained in a bracket 313 secured to the other end of the card-carriage guide-rod 232, said guide-rod 232 being supported at each end by a bracket 314 which may be secured to an end face of the main framework 162.

After the card-carriage 199 has presented its card to the card-ejecting rolls it is returned by power derived from the main shaft 260. Said card-carriage is accordingly provided with a rack 315 secured to the lower member of the channel-section forming said carriage 199. Said rack meshes with a carriage-driven pinion 316 having clutch-teeth 317 and slidable axially on a vertical spindle 318 to which is fastened a toothed driving member 319. With the pinion 316 in normal position, as shown in Figures 6, 10 and 11, the spindle 318 and driving member 319 thereon rotate idly without rotating said pinion.

An arm 320 has a roll 321 engaging a groove 322 of the pinion 316 and is mounted on a rock-shaft 323 which may be rocked in one direction to shift the pinion upwardly against the driving member 319, and which may be rocked in the opposite direction to withdraw said pinion to terminate the carriage-return movement. Said arm 320 and rock-shaft 323 are urged to shift the pinion 316 against the driving member 319 by a spring 324 and are normally restrained by a latch-arm 325 (Figure 6) against which a pin 326 of the arm 320 normally abuts, and which latch-arm is fast to a vertical spindle 327. Also fast to said spindle is an arm 328 actuable by a tappet 329 of the card-carriage 199 to rock said spindle 327 and withdraw the arm 325 from the pin 326, and thereby effect engagement of the carriage-return pinion 316 with the driving member 319. The tappet 329 is so located on the card-carriage 199 that the arm 328 is thus engaged as the card-carriage presents its card to the ejecting rolls, with the result that the card-carriage at this time commences its return movement.

During the return of the card-carriage the card-pushing member 192 is actuated at the proper time to advance a card from the supply-stack and present it to the feed-rolls 190, 191, which advance said card toward the returning card-carriage which may receive said card as soon as the spur 223 thereon is past the new card which is being advanced. For reciprocating the card-pushing member 192, it is connected by a link 330 to a crank 331 fast to a shaft 332 journaled in members 333, 334 of the main framework. For rotating said shaft 332, said shaft carries a gear 335 normally loose thereon and driven by a pinion 336 fast to the shaft 278, Figure 8. To said gear 335 may be keyed a ratchet-wheel 337 forming the driving side of a clutch for locking said gear 335 and shaft 332 together. The other side of said clutch may be a plate 338 carrying pawls 339 normally held away from said ratchet-wheel through the medium of a trip-plate 340 capable of a small rotary movement relative to said pawl-carrying plate 338 to effect engagement of the pawls 339 with the ratchet-wheel 337, and, conversely, capable of a contrary relative movement to withdraw said pawls from the ratchet-wheel. The trip-plate 340 may have a spur 341 (Figure 6) which normally abuts a stud 342 to hold the trip-plate 340 in such position that the pawls 339 are not engaged by the ratchet-wheel 337, which, through its connection with the main shaft 260, is rotating while the carriage is being returned. Upon withdrawing the stud 342, the trip-plate 340 is released and is spring pressed to effect engagement of the pawls 339 with the ratchet-wheel, whereupon the shaft 332 as well as the trip-plate 340 commences to rotate. For shifting the stud 342 it is mounted upon an arm 343 fast to a vertical spindle 344 journaled in a bracket 345 of the main framework, and having a second arm 346 fast thereto. Abutting said arm 346 for one-way connection thereto is another arm 347 which may be displaced by a tappet 348 on the card-carriage 199, the arms 346, 347 being yieldably held together for said one-way connection by a spring 349. Thus it will be seen that movement of the card-carriage in a return direction may displace both the arms 346 and 347 for releasing the clutch-trip plate 340. In the advance movement of said card-carriage the arm 347 is idly diverted by the tappet 348 without rocking the spindle 344, which is held stationary by means of a stop-pin 350 bearing on the side of the arm 343. A spring 351 restores the spindle 344 and its arms to normal position determined by said stop-pin 350 after the card-carriage tappet 348 in the return card-carriage movement has passed the arm 347. Thus the stud 342 is ready to intercept the clutch-trip plate at the end of one revolution, and consequently cause disengagement of the pawls 339 from the ratchet-wheel 337, this phase of the operation taking place as the card-pushing member 192 reaches its normal retracted position. The card-feeding clutch just described and its mode of operation are substantially as set forth in the aforementioned co-pending application of Davis.

The card-pushing member 192 has some excess of return movement, which, in being taken up during the advance movement, may be utilized to withdraw two pins 352 which are normally interposed just ahead of the card-stack to prevent accidental displacement of a card through the card-aperture 188 and also to guide the card lengthwise. Said pins 352 are pivotally connected at their lower ends to arms 353 spaced apart by a cross-rod 354 and a rock-shaft 355 journaled in bushings 356 set in U-shaped sockets 357 formed in the main framework 162. Said bushings are held by screws 358 which also secure spring-plates 359 to said framework for attaching springs 360 that pull upon the arms 353 to hold the card-retaining pins 352 in normal positions in which shoulders of said pins bear against the main framework top through and above which said pins project, see Figures 6 and 8. As soon as the card-pushing member 192 starts forward a pair of rods 361 projecting forwardly from said member 192 cam the cross-rod 354 downwardly, thereby causing withdrawal of the pins 352 below the table-surface 161 of the main framework, as will be evident from Figure 6. As said member 192 with said rods 361 reaches its normal retracted position the pins 352 are restored through the pull of the springs 360.

The lever 257 that depresses the switch-rod 250 may be loosely supported on the rock-shaft 355, and may be retained laterally by a screw 363, the end of which bears against the sides of a groove in said rock-shaft, as indicated in Figure 8. The extension 247 of the rock-shaft 243 may have its outer end journaled in a bracket 364, which may depend from the bracket 273 of the gear-casing 271 and be fastened thereto by screws 365.

The time at which the feed-rolls 190—191 pick up a new card advancing from the card-stack and the rate of advance of said card may be timed in respect to the returning carriage 199, so that the advancing edge of the card is received in the groove 219 of the card-carriage 199 when the spur 223 of said carriage has passed the right margin of the card, as hereinbefore mentioned. The upper feed-rolls 190 are then caused to be slightly raised to check further advance of the card, and also to free the card for subsequent endwise movement with the card-carriage. The movement of the card-pushing member 192 is so timed that as it reaches the end of its backward movement the motion thereof may be used to raise the upper feed-rolls 190. To this end, said card-pushing member 192 may rock a lever 367 having connections to an arm 368 fast to a rock-shaft 369, whereby said upper feed-rolls may be raised, and having fast thereto arms 370 in which are journaled the ends of the shaft 277, carrying said upper feed-rolls 190 and driven by the main shaft 260. It will be understood that the upper feed-rolls 190 need be raised only a small amount, and therefore the gears 279, 280 connecting said main shaft 260 to the shaft 277 need never be out of mesh. The aforesaid feed-roll controlling connection from the lever 367 to the arm 368 includes a link 371 extending forwardly from the lever 367 to rock a shaft 372 by means of an arm 373 fast to said latter shaft. Said shaft 372 may be journaled in a bracket 374 fastened to the bracket 273 of the gear-casing 271, see Figures 7 and 8, and serves to offset the connection between the lever 367 and the arm 368, said shaft having fast thereto an arm 375, which is connected to said arm 368 by a link 376. A spring 377 urges the link 371 rearwardly, and it will be seen that as soon as the card-pushing member 192 starts forwardly the upper feed-rolls 190 are pressed by the force of said spring 377 against the lower feed-rolls 191. The lever 367 may be pivoted on the end of a stud 398 secured in a lug 399 depending from the framework top, and link 371 connected to said lever may have a device 400 for adjusting its length.

Return movement of the card-carriage 199 is checked by withdrawing the pinion 316 from the driving member 319, and, to this end, the rock-shaft 323, whereby said pinion is shifted, carries an arm 378 having at its end a roll 379, which, when the pinion 316 is engaged by the driving member 319, lies in the path of a cam 380 secured to the card-carriage 199, see Figure 9. Said cam 380 is so located on said card-carriage that it displaces the roll 379 as the card-carriage reaches the end of its return movement, thereby rocking the shaft 323 and withdrawing the pinion from the driving member 319 and causing said pinion to be latched up again by means of the arm 325 and pin 326, the latching shaft 327 springing into latching position under the pull of a spring 381. As the pinion 316 is thus withdrawn, the card-carriage is subjected again to the pull of its spring-motor 202 and therefore tends to advance again. To hold the card-carriage until it has received in its slot 219 a new card, a latch 382 is pivoted to the bottom of the main framework top, as shown in Figure 8. A carriage-holding nose 383 of said latch is normally withdrawn from the path of the previously-mentioned card-feed-engaging tappet 348 on the card-carriage 199 when the card-pushing member 192 is in its rearmost position, the withdrawal of said latch 382 being effected by means of a link-rod 384 connecting said member 192 and latch 382. It will be seen that as the card-pushing member 192 moves forwardly the carriage-holding nose 383 of the latch 382 also moves forwardly under the pull of a spring 385, a forward movement of said nose being limited by a stop 427. The link 384 is loosely connected to latch 382 by nuts 387, the other end of the link passing through the card-pushing member 192, which may retract said link by means of nuts 388. The nuts 387 and 388 are adjustable along said link. Inasmuch as the time when the slot 219 of the card-carriage receives a card about coincides with the time when the card-pushing member 192 reaches its rearmost position, it will be seen that the carriage-holding nose 383 may be and is at such time withdrawn, whereupon the card-carriage, with a new card in position, advances under the pull of its spring-motor until the leading zone-determining pin 205 thereon encounters the stepping dog 215 on the escapement-dog-carrier, which meanwhile has also been restored to its normal position as will now be explained. As the card-pushing member 192 reaches the end of its forward movement it displaces the cam-arm 244 to rock the shaft 243 for retracting the slide 231 and causing it to be latched again, it being understood that upon the retraction of said slide 231 the dog-carrier 207 will assume its normal position under the pull of spring 468.

It will be understood that when the card-pushing member thus effects restoration of the escapement-dogs 214, 215, the carriage 199 will have been returned far enough for any stop-pin 205 to be past said dogs, it being feasible to time the mechanism accordingly. The arm 234 controlling said slide 231 is secured by screws 390 to a hub 391 fast to said shaft 243, said arm having elongated screw-holes 478 to permit rotative adjustment of said arm.

The carriage-returning spindle 318 is connected to the shaft 278 by a transverse shaft 392 journaled in bearings 393 depending from the bottom of the main framework top. Said transverse shaft 392 is connected to the spindle 318 by helical gears 394, and is connected to the shaft 278 by helical gears 395, each of said gears 394, 395 being fastened to their respective shafts. The rock-shaft 323 for shifting the carriage-return pinion may be journaled near one end in a bearing 396 (Figure 8) depending from the bottom of the main framework top, the other end of said shaft 323 being journaled in a bearing 397 (Figure 9), which also depends downwardly from the framework top. One end of the shaft 278 is journaled in a transverse portion 499, Figure 8, of the inner bearing 393, the other end of said shaft being journaled in the casing 271, in which are the driving gears for said shaft.

During the return movement of the card-carriage 199, the card-retaining piece 299, which was withdrawn to permit ejection of a card, remains withdrawn. Restoration of said card-retaining piece 299 may be effected as said carriage escapes from the latch 382 and advances to its first zone-position. To this end, there may be provided a cam 402 (Figure 9), which, in order that it may be diverted, may be formed on the end of a lever 403 pivoted on a stud 404 depending from the main framework top. Said lever 403 is held in normal position by a spring 405, so that an adjustable stop 406 bears against the bottom of the framework, see Figure 8. As the carriage escapes toward the left to its first zone-position, the projection 308, of the card-retaining piece 299, is cammed upwardly by the cam 402. The projection 308 of the lowered card-retaining piece 299 in the return movement of the card-carriage passes under the cam 402, and thereby diverts the cam-lever 403, which, however, is immediately restored by its spring 405 to be effective to cam said card-retaining piece upwardly as just stated.

As the cards are ejected from the card-carriage they are deposited in a box-like receptacle 493 which may be placed opposite the card-ejecting rolls 224, 225 with the body of the receptacle inclined below said rolls, as shown, so that as a card passes from said rolls, it may readily drop into said receptacle. For guiding the cards into the receptacle a directing surface 494 may be formed, as indicated in Figure 9. A card, just at the time when it leaves the card-ejecting rolls, is somewhat overbalanced on the rounded portion of said surface 408, and thus curves downwardly toward the receptacle and is deposited without overshooting said receptacle.

A novel device is provided for quickly withdrawing a pack of deposited cards from the receptacle 407 and includes a plate 495 which may lie against the bottom of said receptacle to receive a card, and which may have an outwardly-extending portion 496 against which the edges of the deposited cards abut, as shown. Said portion 496 may be provided with a curved handle 497, whereby said device may be grasped and the pack of deposited cards therewith quickly withdrawn from the receptacle.

For gathering the punchings which fall from the die-plate 160 and preventing them from falling into the mechanism, there may be provided a chute 413 below said die-plate for directing said punchings toward a removable receptacle 414 from which they may be emptied. Said receptacle 414 may be located in a pocket 415 into and out of which it may be slid.

A sheet-metal guard 416 may be provided to cover the mechanism below the main-frame top. A sheet-metal guard 417 may also cover the casing 105 and fixture 106 that includes the punches and punch-selecting mechanism.

As a card advances lengthwise with the card-carriage one edge is retained, as hereinbefore stated, in the card-carriage groove 219. The opposite edge of the card is guided by the pins 352, and also by an edge 418 of the lower fixture 106, with which edge said pins are in line. The guide thus formed by said pins 352 and edge 418 is prolonged in the form of a strip 419, which reaches to the end of the table-surface 161 and is secured thereto by screws 420. The card-carriage spring-motor 202 may have its shaft 421 supported in a bracket 422 secured to the side of the bearing 314 that retains the carriage-guide rod 232. The cam 307 which withdraws the card-retaining piece may also be secured to said bracket 314 by having a bent-over portion 423 which overlies said bracket and is attached thereto by screws 424. Said portion 423 may serve as a shelf for attaching the card-receptacle 493 by screws 425, and which card-receptacle may be braced by a sheet-metal member 426 secured to the framework and receptacle, as indicated in Figure 9.

On account of the comparatively large jumps which the spring-propelled card-carriage 199 may take in moving a card from zone to zone or in advancing to eject a card, it is desirable to govern the speed of the carriage as it takes said jumps, and thereby avoid damage to the escapement-pins 205 or the stepping dog 215, or to the card as it is presented to the ejecting rolls. A speed-governor 428 may therefore be provided, and may include, see Figure 5, a casing 429 enclosing any well-known rotary speed-governing mechanism which may be connected to the card-carriage rack 315 through a pinion 430 on a shaft 431 of said speed-governing mechanism. The speed-governor is always in engagement with said rack and thus may conduce to also govern the speed of the carriage-returning movement. The speed-governor may be attached to the main framework 162 by a bracket 432, one leg of which may be attached to said framework, the other leg being attached to the casing 429 of said speed-governor.

Figure 15 shows how the combined typewriting, computing and card-perforating machine may be supported on the stand 60, which may include rear cross-members 433 and 434 forming braces between the rear legs 435 of said stand. An auxiliary stand 140 supports the main framework 162 of the perforating mechanism which may have lugs 436 for attachment to upright members 437 of said auxiliary stand. The opposite front and rear upright members 437 are connected by upper cross-braces 438 and lower cross-braces 439, said lower cross-braces extending forwardly for attachment to the cross member 433 of the stand 60, and having at the ends, for such attachment, clamp-lugs 440 which may embrace and clamp said cross-member 433. The rear upright members 437 of the auxiliary stand are extended downwardly and forwardly for attachment to the lower cross-member 434 of the main stand 60, the extensions having at their ends lugs 441, similar to the lugs 440, for embracing and clamping said lower cross-member 434. The main framework 162 of the perforating mechanism may be secured to the auxiliary stand by screws 442. Braces 443 extending forwardly from said main framework 162 to the platform or plate 89 of the computing mechanism may be secured to said main framework 162 by the screws 442 and to the plate 89 by a clamp-and-screw device, one side of which may be an upturned end 444 of the brace 443, the opposite side being an upturned end 445 of a piece secured to the bottom of said brace 443, the space between said upturned ends 444, 445 being wider than the flanged rim 446 of the stand top 89. A screw 447 threaded into the upturned end 444 may bear on the outside of the rim 446 to clamp said rim between the end of said screw and the upturned end 445. A feature of the supporting means of the perforating mechanism just described is that said means afford sidewise displacement of the entire perforating mechanism with respect to the computing mechanism, which is an advantage in that the card-perforating mechanism may be set for control by different sets of register-bars. Thus, it will be seen that whereas Figure 15 represents the card-perforating mechanism as being controlled by the register-bars of register No. 2, it is nevertheless possible to disconnect the links 100—138 from the bars 46 of the No. 2 register and from the levers 151, and then, by shifting the auxiliary supporting stand of the perforating mechanism, to have said mechanism reconnected by the links 100—138 with the register-bars of say register No. 3, such shifting of the auxiliary stand being represented in Figure 15 by a dot-and-dash representation of the clamp-lugs 440, 441 and the clamp-and-screw device 444—447. Only the cover-plate 62ᵃ over the push-rods 62 for the No. 2 register is shown with an opening or perforation for the passage of the connecting links 153, and when these links are disconnected prior to the shifting of the perforating stand, this perforated cover-plate may be exchanged for the solid cover-plate over the rods 62 for a No. 1, 2 or 4 register. In this manner unnecessary dust-openings to the interior mechanisms are eliminated. The auxiliary stand has braces 438.

In shifting the auxiliary stand relatively to the main stand, for connection of the perforating mechanism to different registers, corresponding changes in the links 210, 239 and 180 have to be made. It will be noticed that the duty of the links 210 and 239 is light, and that therefore the ends of each of said links 210 and 239 may be offset for connections to the parts which they are intended to join. As an alternative to such offsetting, it may be noted, see Figure 5, that the arm 211 may be moved along the shaft 212 to minimize or eliminate offsetting of the link 210. Similarly, the arm 241, Figure 1, may be moved on the shaft 242, which shaft may be of sufficient extent for this purpose to minimize or eliminate offsetting of the link 239. Offsetting of the link 180, Figure 1, may also be minimized or entirely avoided by shifting the arm 179 on the shaft 177.

A pulley 456 pivoted upon a swingable arm 457, fulcrumed on the perforating mechanism main framework at 448, may tension the perforator-driving belt 268, said arm 457 being pulled upon by a spring 459.

An adjustable mirror 449 is provided to reflect a view of the perforating mechanism, and the cards therein, at the back of the machine, to an operator at the front of the machine. Said mirror 449 is retained in a frame 450 having a tiltable and extensible connection 451 to a horizontally-bent portion 452 of an upright rod 453, which may be clamped for up-and-down adjustment in a socket 454 secured to the table-surface 161 of the perforating mechanism, said socket having a clamp-screw 455. Adjustment of the mirror 449 may thus be made in respect to an operator at the front of the machine, so that the operator may note the progress of a card through the perforating mechanism and the operation of the perforating mechanism.

Figure 4 shows, in perspective, details of transposing levers 65 that may be directly actuated by the push-rods 62 to directly actuate the register-bars 46 seriatim in reverse order to the order in which said push-rods 62 are actuated. Each lever 65 has, as previously stated, an arm 66 connected to a push-rod 62 and an offset arm 67 which may push the corresponding register-bar forwardly as the push-rod is depressed. The cross-bails 64 are different distances from a fulcrum-rod 460 for said levers 65, so that said bails may be nested close to one another, as indicated in Figure 4. Figure 4 indicates how one group of cross-bails 64 is nested in one direction (vertical), the remainder of the cross-bails being nested in another direction (horizontal), said bails being thus nested in different directions to avoid interference. Each arm 67 of a lever 65 extends downwardly and may have a bent-over tab 461, which may engage a piece 462 projecting upwardly from the link connecting the corresponding register-bar 46 and punch-selecting slide 147. A single piece, namely, a lever 65 therefore suffices to transmit an impulse from a push-rod and deliver it in the right direction to advance the register-bar and also transpose said impulse to the proper register-bar as aforesaid.

For keeping a new card that is being advanced from the supply-stack close to the table-surface 161 so that it may properly enter the slot 219 of the carriage, there is provided a plate 472, Figure 3, parallel to said table-surface and slightly raised therefrom to permit the passage of the card thereunder. Said plate is attached by screws 473 to the front face of the throat-block 187, said screws passing through an upturned portion 474 of said plate. The plate may have tongues 475 which extend almost to the card-carriage and which are formed by cutting the plate back as indicated at 476, the openings thus formed in the plate affording room for manipulating the card if necessary, and also exposing the card to view.

For adjusting the upper feed-rolls 190 parallel with the lower feed-rolls 191 one end of the rock-shaft 369 that carries said upper feed-rolls is journaled in a bearing 480 that is adjustable toward and from the lower feed-rolls. The other end of said rock-shaft 369 may be journaled in the side of the casing 271, Figure 3. The adjustable bearing 480 may be retained in guides 481 formed at the side of the die-plate fixture 106, Figure 12. Projecting over said guides 481 is a lug 482 formed on the side of the slide-retaining casing 105, through which are passed screws 483 from which the bearing 480 is suspended. A screw 484 is threaded into said lug 482 to bear on the top of said bearing 480 and co-operate with the screws 483 for adjusting said bearing toward and from the feed-rolls 191 and also to hold the adjustment. It will be evident that loosening the screws 483 and tightening the screw 484, or vice versa, is effective to raise or lower said bearing 480.

The rock-shaft 243—247 may be journaled at one end in the bracket 364 as already stated. At the other end and at an intermediate point said shaft is journaled in split bearings formed by slotted lugs 485 depending from the bottom of the main frame top, the top of the slot in each lug forming one-half of the shaft bearing, the bottom half being formed on the top of a block 486 inserted in the slotted lug and retained by a screw 487, see Figures 6 and 8.

The outer side of the gear casing 262 may be closed by a cover 488, in which the end of the main shaft 260 may bear, see Figure 16, and in which an adjustable screw 489 may be threaded to take up end thrust of said main shaft 260, the adjustment of the screw 489 being secured by a lock-nut 490.

The card-carriage 199 being of channel-shaped section, the holes 206 in which the pins 205 are set may be drilled through and easily reamed to fit the pins 205, which may be provided with flanges 491, Figure 10, having counterbored seats at the top of said holes to not only prevent the pins from falling through, but to also brace the pins as they encounter the escapement-dogs, said flanges fitting the sides of the counterbored seats.

When the types and calculating registers are omitted, the numeral-keys 30 and the denominational tabulating keys 73 remain positioned as in Figure 1, the numeral-keys 30 operating the same as described above, through stems 59 to depress their respective pin-setting bars 55. The denominational keys 73 transmit motion to the pin-bars 46, the depressing of any denominational key 73 being effective to advance its corresponding pin-bar 46 slightly to the left, viewing the machine as shown in Figure 1, so as to bring the settable pins 47 under the bars 55 to be selected and set up thereby according to whichever numeral-key 30 is operated, as specified above.

Variations may be resorted to within the scope of the invention, and portions of the improvements may be used without others.

Having thus described my invention, I claim:

1. In a card-punching mechanism, the combination with a plurality of columns of punches, said columns spaced a certain distance apart, a corresponding number of punch-selectors similarly spaced, each selector movable along a corresponding punch-column, and a corresponding number of punch-selector-actuators, of means including keys whereby said actuators are operated in different extents of movement determined by said keys, said means requiring said actuators to be spaced differently apart from the punch-selectors, said actuators arranged in tandem with said punch-selectors, and devices connecting said actuators severally to said punch-selectors for joint movement, said devices including bars having offset portions mounted to avoid the interference which would otherwise be caused because of the difference in spacing of said actuators and selectors and their different extents of joint movement.

2. In a perforating machine, the combination with a series of punch selecting slides spaced apart in parallel planes and operable to move endwise individually to different extents to determine the punches to be operated, and a series of slide-operators connected in tandem with said slides, the slide-spacing differing from the operator-spacing, of a series of links connecting said slides to their respective operators for joint movement, alternate ones of said links having portions offset toward one side of a direct line of connection between said slides and operators, the intermediate links having portions offset toward the opposite side of a direct line of connection, said offset portions embodying the link-portions which would otherwise interfere because of the aforesaid different spacing of said links and slides and their extents of joint movement.

3. In a card-punching machine having punches and a framework having a table-surface including punch-dies over which a card may be advanced to bring different parts of the card under the punches, means for so advancing a card, said means including a rod of channeled cross-section mounted for endwise movement in which one side of said section bears on a transverse edge of said table-surface, said side having a slot milled lengthwise of said rod and coinciding with said table-surface for receiving a card edge, and means spaced apart lengthwise of said slot for abutment with opposite card sides, whereby the card is pushed along with said rod and fixed lengthwise thereof.

4. In a card-punching machine having punches and a framework having a table-surface including punch-dies over which a card may be advanced to bring different parts of the card under the punches, means for so advancing a card, said means including a rod mounted for endwise movement and having a card-edge receiving face extending lengthwise thereof and adjacent to a transverse edge of said table-surface, and a card-pushing spur projecting from said face over and close to said surface, said spur having a card-pushing face at an angle inclined toward said table-surface to prevent escape of the card edge engaged thereby.

5. In a card-punching machine having punches and a framework having a table-surface including punch-dies over which a card may be advanced to bring different parts of the card under the punches, means for so advancing a card, said means including a rod mounted for endwise movement and having a card-edge receiving face extending lengthwise thereof and adjacent to a transverse edge of said table-surface, a card-pushing spur projecting from said face over and close to said surface, said spur having a card-pushing face at an angle inclined toward said table-surface to prevent escape of the card edge engaged thereby, and means for effecting adjustment of said spur in a direction lengthwise of said rod.

6. In a card-punching machine or the like having a spring-driven carriage and escapement-stops thereon, an escapement-dog carrier formed of a sheet-metal blank including a flat portion on which a stepping dog is pivoted to swing with the advancing carriage, a holding dog bent from said flat portion and integral therewith, said blank also having tongues projecting from opposite sides of said flat portion, means having grooves engaging said tongues, said means and tongues disposed so that the dog-carrier is guided transversely of the carriage-travel direction for reciprocatory movement, said blank also having spaced-apart ears and a pintle therebetween extending transversely of the dog-carrier reciprocatory movement, said ears disposed so that said pintle is spaced from said tongues in the direction of said movement, and a vibratory arm having an end through which said pintle passes and effective to reciprocate said dog-carrier.

7. In a card-perforating machine or the like having a cycle of operations, the combination with a spring-driven carriage, escapement-stops thereon, a reciprocatory dog-carrier having escapement-dogs co-operating with said stops to advance and hold the carriage, and a shaft connected to the dog-carrier for reciprocating said carrier, of means for withdrawing said carrier and thereby said dogs from said stops to release said carriage for independent movement, said means including an arm fast on said shaft, a normally latched spring-pressed endwise movable rod having at its end a cam for displacing said arm, key-controlled means for releasing said rod, at will, and means effective at a predetermined point of said cycle to restore said rod and carrier.

8. In a card-punching machine having a series of denominational columns of digit-punches, the combination with punch-selectors, each selector effective to move along a corresponding punch-column, a series of denominational indexing devices, and key-controlled means to set up numerical values therein, said devices operable to move extents of movement individually according to said numerical values, the lateral spacing of the indexing devices differing from that of the punch-selectors, of a series of links connecting said indexing devices to corresponding punch-selectors in tandem relation for concomitant action, whereby the digit-punches corresponding to the digits indexed are selected to be operated, each of said links having a crook therein, alternate links having said crooks mounted toward one side of a direct line of connection between said selectors and indexing devices, and the intermediate links having crooks mounted toward the opposite side of said line of connection, said crooks effective by said arrangement to permit free movement of said selectors and indexing devices throughout their range of operation.

9. In a card-punching machine having a series of denominational columns of digit-punches, the combination of numeral-keys, punch-selectors, each selector effective to move along a corresponding punch-column, a series of denominational indexing devices controlled by said keys and operable to move different extents of movements to set up the desired punch to operate in each denomination, the lateral spacing of the indexing devices differing from the corresponding spacing of the punch-selectors, and a series of links connecting said indexing devices to corresponding punch-selectors in tandem relation for concomitant action, whereby the digit-punches corresponding to the digits indexed are selected, each of said links having a crook, alternate links having said crooks mounted upwardly, and the intermediate links having crooks mounted downwardly, said crooks effective by said arrangement to permit free movement of said selectors and indexing devices throughout their range of operation.

10. In a card-punching mechanism, the combination with a plurality of columns of punches, said columns being spaced a given distance apart, a corresponding number of punch-selectors similarly spaced, each selector effective to move along a corresponding punch-column, and a corresponding number of punch-selector actuators, of means including keys, whereby said actuators are indexed to move the selectors to select certain punches, the actuators being spaced a greater distance apart than the columns of punches, and a plurality of links connecting the actuators and the punch-selectors in tandem relation, alternate links having crooks arched toward one side of a direct line of connection between the selectors and actuators, the intermediate links having crooks arched toward the opposite side of said line, said links having laterally-bent portions, whereby, along with said crooks, said links, actuators and punch-selectors have a free path in which to move.

11. In a card-punching mechanism, the combination with a plurality of columns of punches, said columns being spaced a given distance apart, a corresponding number of punch-selectors similarly spaced, each selector effective to move over a corresponding punch-column, and a corresponding number of punch-selector actuators, of means including keys, whereby said actuators are indexed to control the selection of certain punches, the actuators being spaced laterally a greater distance apart than the columns of punches, and the selectors therefor, and a set of links connecting the actuators and the punch-selectors in tandem relation, alternate links, constituting the outer members of said set of links, having a portion thereof offset toward one side of a direct line of connection between the selectors and actuators, the intermediate links having similar portions offset toward the opposite side of said line, the links constituting the central members of said set being straight, whereby said links and the actuators and punch-selectors have a free path in which to move.

12. In a perforating machine, a plurality of punches, a plurality of selectors to select certain punches to be operated, a plurality of indexing devices to control said selectors, including thrust-rods, one for each indexing device, a series of motion-transmitting links, and levers forming direct connections between said rods and said selectors, each lever having an arm directly engaged by one end of a link, the other end of the link connected to one of said rods, said lever also having another arm directly engaging the selectors, each link having a loop between its terminals, the loops of the several links being mounted in different positions to avoid interference in their movements.

13. In a card-punching machine, a table, a set of punches mounted over said table, means for advancing a card over the top of said table to bring different zones thereof successively under said punches, said card-advancing means including a movable carriage bearing against the edge of said table, a gage on the carriage to receive and locate the card thereon, a projection to engage one end of the card to advance the same over the table, card-retaining means spaced lengthwise of said gage for engaging the opposite end of said card, effective along with said projection to hold the card securely in position on said carriage, said card-retaining means slidably mounted in said carriage, and means at each end of the table, effective to control the sliding operation of said card-retaining means to hold or release the card.

14. In a card-punching machine, a table, a plurality of punches overhanging said table, punch-dies supported by the table, means for advancing a card in a straight path over the table under the punches, means for advancing the card after being punched, along the same path to deposit the same, said card-advancing means including a movable carriage having a gage-edge to receive the card, a projection on the carriage to engage the card and advance it over the table, a card-retaining piece to hold the card in position in the carriage, said piece mounted for sliding vertically in either one of two positions, one position for holding the card during perforating and the other for releasing the card to be deposited, guides on which said card-retaining piece slides, and spring-pressed detenting means for yieldably holding said card-retaining piece in either of said positions.

15. In a card-punching machine, a table, a plurality of punches overhanging said table, punch-dies supported by the table, means for advancing a card in a straight path over the table under the punches, means for advancing the card after being punched, along the same path to deposit the same, said card-advancing means including a movable carriage having a gage-edge to receive the card, a projection on the carriage to engage the card and advance it over the table, a card-retaining piece to hold the card in position in the carriage, said piece mounted for sliding vertically to either one of two positions, one position for holding the card during perforating and the other for releasing the card to be deposited, guides on which said card-retaining piece slides, spring-pressed detenting means for yieldably holding said card-retaining piece in either of said positions, means for returning said carriage, means for feeding a new card thereto, and means automatically effective to restore the card-retaining piece as the carriage moves to its initial position to receive the new card.

16. A card-perforating mechanism having a single set of punches arranged in a plurality of rows, a punch-selector for each row of punches, a multiple indexing device including a plurality of sets of punch-indexing members, each set including an actuator for each of said selectors, auxiliary mechanism associated with said multiple indexing device and operative to actuate the perforating mechanism, a stand supporting said indexing device and auxiliary mechanism, a frame supporting said perforating mechanism, said stand including a lateral guide for said frame upon which said frame may be shifted laterally, whereby said frame may be adjusted relatively to said stand for selectively connecting the punch-selectors to the actuators of any one of said sets of indexing members, and links connecting said indexing device, auxiliary mechanism and perforating mechanism for joint operation, the extent of said links depending upon the relative positions of said stand and frame.

17. A card-perforating mechanism having a single set of punches arranged in a plurality of rows, a punch-selector for each row of punches, a multiple indexing device including a plurality of sets of punch-indexing members, each set including an actuator for each of said selectors, auxiliary mechanism associated with said multiple indexing device and operative to actuate the perforating mechanism, a stand supporting said indexing device and auxiliary mechanism, a frame supporting said perforating mechanism, said stand including a lateral guide for said frame upon which said frame may be shifted laterally, whereby said frame may be adjusted relatively to said stand for selectively connecting the punch-selectors to the actuators of any one of said sets of indexing members, a set of connecting links effective to connect the punch-selectors to the actuators of any one of said sets of indexing members, and links connecting said auxiliary mechanism and perforating mechanism for joint operation, the extent of said latter links depending upon the relative positions of said stand and frames.

ALFRED G. F. KUROWSKI.